United States Patent
Bartolomé Rodrigo et al.

(10) Patent No.: US 12,021,922 B2
(45) Date of Patent: Jun. 25, 2024

(54) METHODS OF OPERATING SERVICE CONTROL NODES

(71) Applicant: Telefonaktiebolaget LM Ericsson (publ), Stockholm (SE)

(72) Inventors: Maria Cruz Bartolomé Rodrigo, Madrid (ES); Attila Mihály, Dunakeszi (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 45 days.

(21) Appl. No.: 17/294,938

(22) PCT Filed: Nov. 19, 2019

(86) PCT No.: PCT/EP2019/081713
§ 371 (c)(1),
(2) Date: May 18, 2021

(87) PCT Pub. No.: WO2020/104408
PCT Pub. Date: May 28, 2020

(65) Prior Publication Data
US 2022/0021731 A1 Jan. 20, 2022

(30) Foreign Application Priority Data
Nov. 19, 2018 (EP) .................................. 18382827

(51) Int. Cl.
*H04L 67/1014* (2022.01)
*H04L 67/1034* (2022.01)
(Continued)

(52) U.S. Cl.
CPC ...... *H04L 67/1014* (2013.01); *H04L 67/1034* (2013.01); *H04L 67/563* (2022.05); *H04L 67/63* (2022.05)

(58) Field of Classification Search
CPC ... H04L 67/1014; H04L 67/563; H04L 67/63; H04L 67/1034
See application file for complete search history.

(56) References Cited

U.S. PATENT DOCUMENTS

2009/0165079 A1   6/2009  Brunswig et al.
2010/0262717 A1  10/2010  Critchley et al.
(Continued)

FOREIGN PATENT DOCUMENTS

CN    107306278 A    10/2017
EP      3160190 A1    4/2017

OTHER PUBLICATIONS

3GPP TR 23.742 V1.0.0 (Sep. 2018); 3rd Generation Partnership Project; Technical Specification Group Services and System Aspects; (Year: 2018).*

(Continued)

*Primary Examiner* — Dhairya A Patel
(74) *Attorney, Agent, or Firm* — Murphy, Bilak & Homiller, PLLC

(57) ABSTRACT

A service controller receives an operation request for a service for a consumer node of a communication network, the operation request including a context identifier referring to a context related to the operation request. The service controller forwards the operation request to a first service instance set being identified by the service controller as handling the context related to the operation request. Responsive to determining that the first service instance set is unreachable or unavailable, the service controller selects a second service instance set as a candidate to handle the context related to the operation request. The operation request for the service is then forwarded to the second service instance set.

14 Claims, 15 Drawing Sheets

(51) Int. Cl.
    *H04L 67/563*   (2022.01)
    *H04L 67/63*    (2022.01)

(56)          References Cited

U.S. PATENT DOCUMENTS

| | | | |
|---|---|---|---|
| 2011/0280143 | A1  | 11/2011 | Li et al. |
| 2012/0151249 | A1* | 6/2012  | Swan .................... G06F 11/203 |
| | | | 714/4.11 |
| 2013/0295891 | A1* | 11/2013 | Moon ................... H04W 4/203 |
| | | | 455/414.1 |
| 2016/0154870 | A1* | 6/2016  | Lachaume .......... H04L 67/1095 |
| | | | 707/626 |
| 2017/0303259 | A1* | 10/2017 | Lee ....................... H04W 28/16 |
| 2018/0084081 | A1* | 3/2018  | Kuchibhotla ........... H04L 67/51 |
| 2019/0261260 | A1* | 8/2019  | Dao ....................... H04W 48/00 |
| 2020/0007632 | A1* | 1/2020  | Landais .................. H04L 67/02 |
| 2021/0168215 | A1* | 6/2021  | Zong .................... H04L 67/146 |
| 2021/0329098 | A1* | 10/2021 | Bartolomé Rodrigo ..................... H04L 67/01 |
| 2022/0021731 | A1* | 1/2022  | Bartolomé Rodrigo ..................... H04L 67/563 |

OTHER PUBLICATIONS

Pathan, Al-Mukaddim Khan, et al., "A Taxonomy and Survey of Content Delivery Networks", Grid Computing and Distributed Systems (GRIDS) Laboratory Department of Computer Science and Software Engineering University of Melbourne, Parkville, VIC 3010, Australia, Sep. 4, 2012, pp. 1-44.

3GPP, "3rd Generation Partnership Project; Technical Specification Group Services and System Aspects; Study on Enhancements to the Service-Based Architecture (Release 16)", 3GPP TR 23.742 V1.0.0, Sep. 2018, 1-101.

3GPP, "3rd Generation Partnership Project; Technical Specification Group Services and System Aspects; Procedures for the 5G System; Stage 2 (Release 15)", 3GPP TS 23.502 V15.3.0, Sep. 2018, 1-330.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

* cited by examiner

METHODS OF OPERATING SERVICE CONTROL NODES

The present disclosure relates generally to communications, and more particularly to communication networks and related methods and network nodes/entities/functions/servers.

5G System Rel-15 has been released as documented in 3GPP TS 23.502 v15.3.0 "Procedures for 5G System; Stage 2" and 3GPP TS 23.501 v15.3.0 "System Architecture for 5G System; Stage 2".

The 5GC Control Plane as being defined in ongoing Rel-15 includes a disruptive change: traditional (pre-5GC) peer-to-peer interfaces and protocols are now replaced by a so-called SBA (Service Based Architecture), where each logical Network Function (NF) exposes one or multiple well-defined services (as a producer) to whatever other NF acting as service consumer by means of versioned HTTP2/REST APIs known as Service Based Interfaces (SBI). That is, there will be a network domain—basically the core network, CN—in which the different functional components are defined as services, which are self-contained functionalities that can be changed and modified in an isolated manner without affecting the other services.

A new Network Function named NRF (Network Repository Function) has been defined to provide NF-service discovery capabilities in 5GC, allowing NF-service producers to register their exposed NF-services by invoking the "NFRegister" operation offered through the "Nnrf_NFManagement" service by a NRF instance for later NF-service consumers to discover them through NRF exposed "Nnrf_NFDiscovery" service. A NF instance acting as service provider provides/updates at NF service registration time its "NF profile", including (among other information) all provided NF services and, for each of them, the related end-point addresses.

The services in 5GC will likely be built in a stateless way, i.e., the business logic and data context will be separated. This means that the services store their context externally in a proprietary DB. This will enable various cloud infrastructure features like auto-scaling or auto-healing.

In the context of the envisaged enhanced SBA (eSBA) as disclosed in 3GPP TR 23.742 v1.0.0 "Study on Enhancements to the Service-Based Architecture" (in the following denoted as "eSBA TR") a concept of a set of instances is discussed, see therein Solution 11 in clause 6.11.

This solution proposes to define a so-called Services Instance Set concept that can support high reliability and also has potential to improve other aspects of the 5GC architecture.

The key principles for Service Instance Sets are:
A Set of instances of the same service type.
All Service instances in a Set can access the same data storage e.g. UDSF.

As shown in FIG. 9, which corresponds to FIG. 6.11.2-1 of the eSBA TR, a Service Instance Set has a storage resource accessible by all service Instances in the Set. A Service Instance Set may expose individual service instances towards consumers or it can use a load balancer. If a load balancer is used the Service Instance Set may appear as one Service Instance towards consumers.

When a Service Instance Set exposes multiple service instances towards a consumer, the consumer is allowed to reselect a different Service Instance (within the same set) between transactions.

As shown in FIG. 10, which corresponds to FIG. 6.11.2-2 of the eSBA TR, a Service Instance Set may span multiple data centers As well, in the context of the eSBA TR, a requirement may be to achieve an independent management per each service, but sometimes this may not be possible as long as some defined services (in Rel-15) have some common data, that is accessed internally by implementation dependent interfaces. One possible solution for that problem is to not consider those services as independent from a management perspective, but consider a group, referred to as a "deployment unit". This deployment unit may include two or more instances of different service types that are deployed together and are from a single vendor. Since the service instances within the deployment unit may share some data, it may be difficult to accommodate access to a same storage resource for different operations relating to a same context.

SUMMARY

According to some embodiments, a method is provided to operate a service controller of a communication network. An operation request for a service is received, wherein the operation request is for a consumer node of the communication network, and wherein the operation request includes a context identifier referring to a context related to the operation request. The operation request for the service is forwarded to a first service instance set, wherein the first service instance set is identified by the service controller as handling the context related to the operation request. Responsive to determining that the first service instance set is unreachable or unavailable, a second service instance set is selected as a candidate to handle the context related to the operation request. The operation request for the service is forwarded to the second service instance set based on selecting the second service instance set.

There is further provided a method of operating a service instance set node for a service of a communication network. An operation request for the service is received from a service controller, wherein the request includes a context identifier. Responsive to receiving the operation request, a context data request is transmitted to a service storage resource node, wherein the context data request includes the context identifier. After transmitting the context data request, a context data response is received from the service storage resource node, wherein the context data response includes context data corresponding to the context identifier. An operation response is transmitted to the service controller based on the operation request and based on the context data.

There is further provided a method of operating a service storage resource in a communication network. Therein, context data is received from a first service instance set, and a context data request is received from a second service instance set. A context data response is transmitted to the second service instance set responsive to receiving the context data request, wherein the context data response includes at least a portion of the context data.

There is further provided a service controller, a service instance set node and a service storage resource being adapted to perform the respective method.

Operations regarding a same UE or session context may thus be able to access the service that may be provided by any one of multi vendor service instances.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 11:
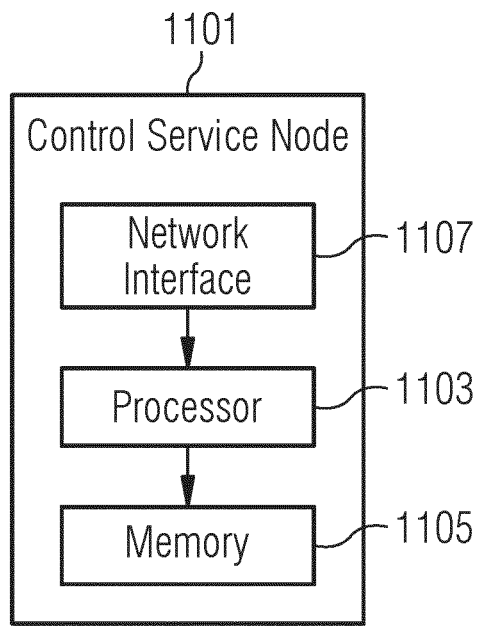
FIG. 11 is a block diagram illustrating a service controller (also referred to as a control service node) according to some embodiments of inventive concepts.

FIG. 11 is a block diagram illustrating elements of a service controller 1101 (also referred to as a control service node or service controller node/entity/function/server) configured to support cellular communication according to some embodiments of inventive concepts. As shown, service controller 1101 may include a network interface circuit 1107 (also referred to as a network interface) configured to provide communications with other network nodes/entities/functions/servers. The network entity may also include a processor circuit 1103 (also referred to as a processor) coupled to the network interface circuit 1107, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein (e.g., operations illustrated in FIGS. 3, 4, 5, and/or 8). According to other embodiments, processor circuit 1103 may be defined to include memory so that a separate memory circuit is not required.

As discussed herein, operations of the service controller 1101 may be performed by processor 1103 and/or network interface 1107. For example, processor 1103 may control network interface 1107 to transmit communications through network interface 1107 to one or more other network nodes/entities/functions/servers and/or to receive communications through network interface from one or more other network nodes/entities/servers. Moreover, modules may be stored in memory 1105, and these modules may provide instructions so that when instructions of a module are executed by processor 1103, processor 1103 performs respective operations. Operations of service controller 1101, for example, may be performed by one server or distributed across a plurality of network servers having the structure of FIG. 11, and a plurality of such distributed servers may be collectively referred to as a server. According to some embodiments service controller 1101 may be provided as a virtual service controller node.

Figure 12:
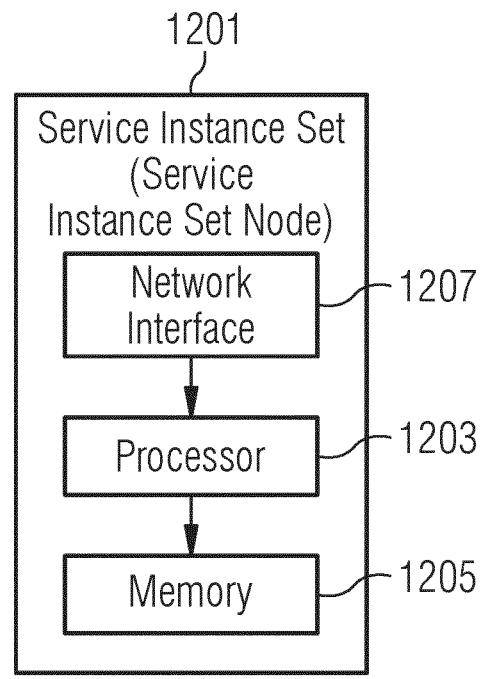
FIG. 12 is a block diagram illustrating a service instance set (also referred to as a service instance set node) according to some embodiments of inventive concepts.

FIG. 12 is a block diagram illustrating elements of a service instance set/node/entity/function/server 1201 configured to support cellular communication according to some embodiments of inventive concepts. As shown, service instance set 1201 may include a network interface circuit 1207 (also referred to as a network interface) configured to provide communications with other network nodes/entities/functions/servers. The network entity may also include a processor circuit 1203 (also referred to as a processor) coupled to the network interface circuit 1207, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein (e.g., operations illustrated in FIG. 8, and/or operations discussed below with respect to respective Example Embodiments). According to other embodiments, processor circuit 1203 may be defined to include memory so that a separate memory circuit is not required.

As discussed herein, operations of the service instance set 1201 may be performed by processor 1203 and/or network interface 1207. For example, processor 1203 may control network interface 1207 to transmit communications through network interface 1207 to one or more other network nodes/entities/functions/servers and/or to receive communications through network interface from one or more other network nodes/entities/servers. Moreover, modules may be stored in memory 1205, and these modules may provide instructions so that when instructions of a module are executed by processor 1203, processor 1203 performs respective operations. Operations of service instance set 1201, for example, may be performed by one server or distributed across a plurality of network servers having the structure of FIG. 12, and a plurality of such distributed servers may be collectively referred to as a server. According to some embodiments service instance set 1201 may be provided as a virtual service instance set.

Figure 13:
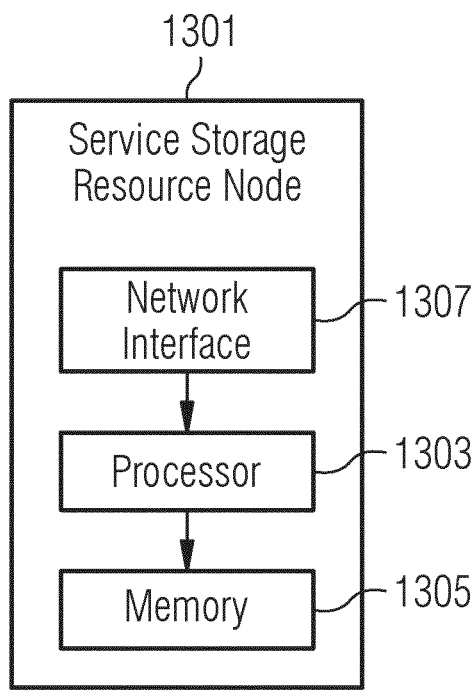
FIG. 13 is a block diagram illustrating a service storage resource node according to some embodiments of inventive concepts.

FIG. 13 is a block diagram illustrating elements of service storage resource node/entity/function/server 1301 configured to support cellular communication according to some embodiments of inventive concepts. As shown, shared service resource node 1301 may include a network interface circuit 1307 (also referred to as a network interface) configured to provide communications with other network nodes/entities/functions/servers. The network entity may also include a processor circuit 1303 (also referred to as a processor) coupled to the network interface circuit 1307, and a memory circuit 1305 (also referred to as memory) coupled to the processor circuit. The memory circuit 1305 may include computer readable program code that when executed by the processor circuit 1303 causes the processor circuit to perform operations according to embodiments disclosed herein (e.g., operations illustrated in FIG. 8, and/or operations discussed below with respect to respective Example Embodiments). According to other embodiments, processor circuit 1303 may be defined to include memory so that a separate memory circuit is not required.

As discussed herein, operations of the shared service storage resource node 1301 may be performed by processor 1303 and/or network interface 1307. For example, processor 1303 may control network interface 1307 to transmit communications through network interface 1307 to one or more other network nodes/entities/functions/servers and/or to receive communications through network interface from one or more other network nodes/entities/servers. Moreover, modules may be stored in memory 1305, and these modules may provide instructions so that when instructions of a module are executed by processor 1303, processor 1303 performs respective operations. Operations of service storage resource node 1301, for example, may be performed by one server or distributed across a plurality of network servers having the structure of FIG. 13, and a plurality of such distributed servers may be collectively referred to as a server. According to some embodiments service storage resource node 1301 may be provided as a virtual service storage resource node.

While FIGS. 11-13 illustrate structures of a service controller node/entity/function/server, a service instance set node/entity/function/server, and a service storage resource node/entity/function/server, respectively, other network nodes/entities/functions/servers may have the same/similar structure including a network interface, a processor, and memory. As used herein, a node may be a virtual node, a service, entity, function, and/or server. For example, such a structure including a network interface, a processor, and memory may be used for a consumer node/entity/functions/server, producer node/entity/functions/server, network repository function node/entity/functions/server, single point of access node/entity/functions/server, load balancer node/entity/functions/server, storage resource node/entity/functions/server, service instance node/entity/functions/server, NRF service instance node/entity/functions/server, etc. A radio access network RAN node may be provided using a similar structure with a transceiver also coupled with the processor to provide wireless communication with one or more wireless devices (also referred to as UEs, User Equipment, User Equipment nodes, wireless terminals, etc.) over a radio interface.

Figure 1:
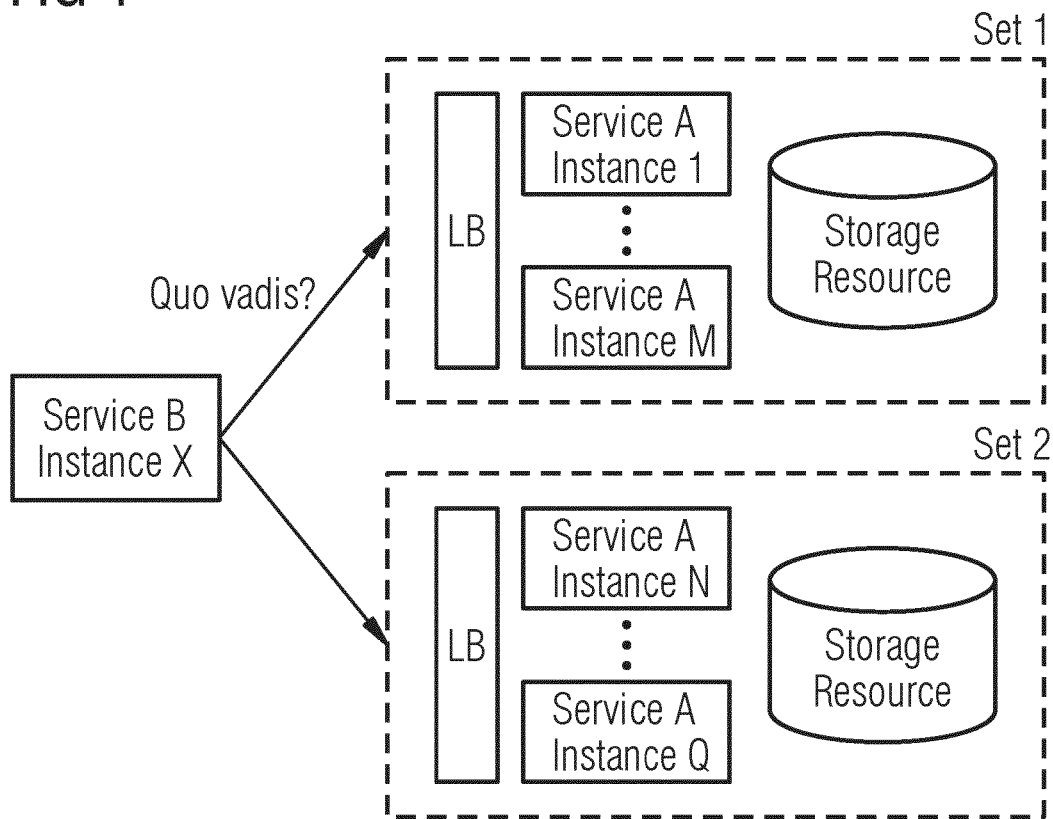
FIG. 1 is a block diagram illustrating service A instances deployed in two sets (also referred to as groups)

FIG. 1 is provided as an example, where instances of same service A are deployed in two different Sets, i.e., there are two groups of instances (also referred to as sets of instances) that have access to different storage resources. FIG. 1 illustrates service A deployed in two sets.

In FIG. 1, each set of instances may just offer one single point of access (e.g. a Uniform Resource Identifier, URI) to service B (or any other consumer). As an example, a load balancer LB is included to reflect that, but other solutions may be possible, and this is not part of this disclosure.

Figure 2:
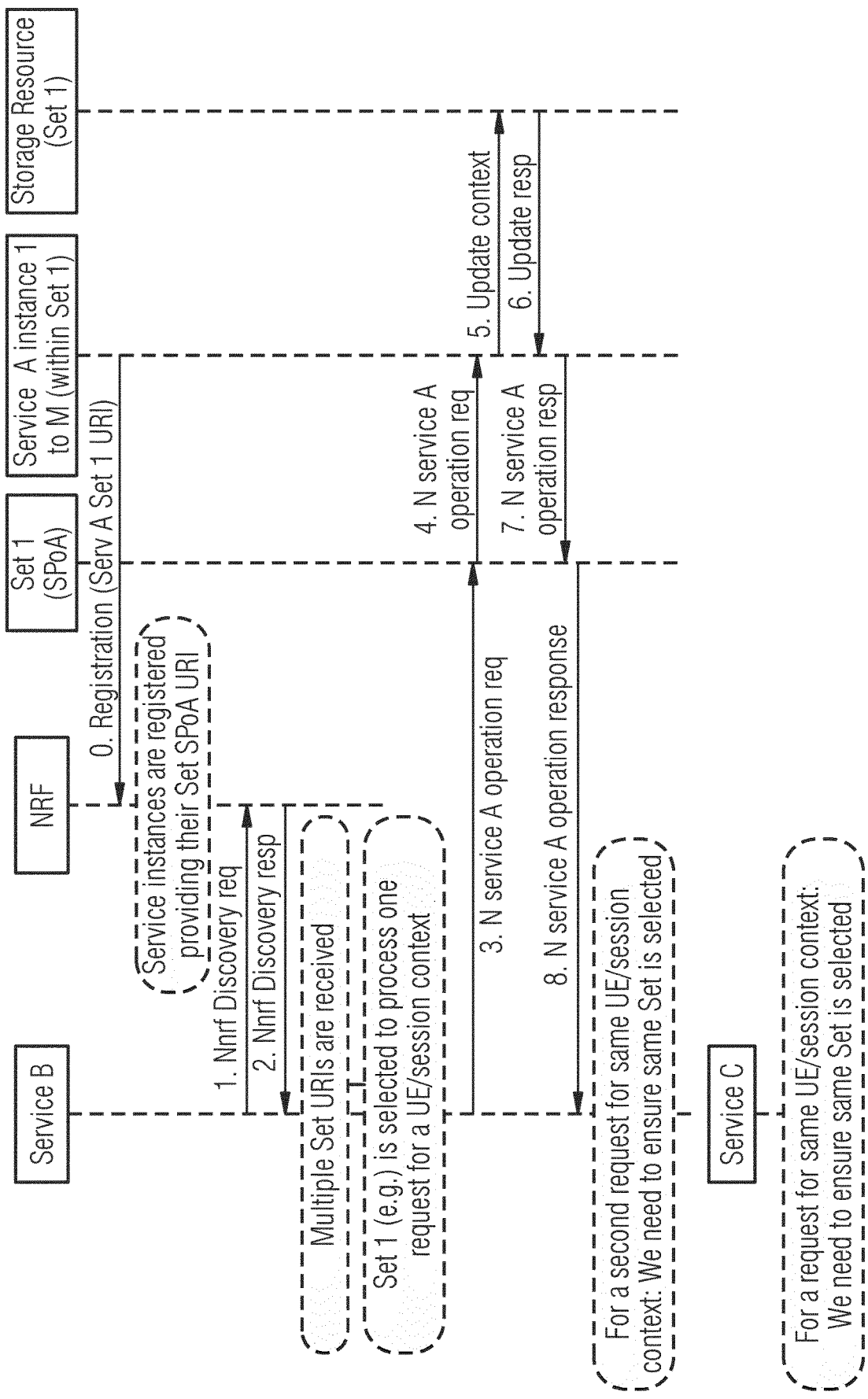
FIG. 2 is a message diagram illustrating selection of a same set for a same UE/session context.

FIG. 2 illustrates a same set that may need to be selected for the same UE/session context. Operations of FIG. 2 are discussed below:

Operation 0. Service A instances registered to an NRF (also referred to as an NRF node/entity/function/server) providing a single URI for the whole Set. This may correspond to a LB or any other solution to hide the pool of instances. Set SPoAs (Single Point of Access) are displayed in the figure to ease understanding that the instances are not contacted directly by the end consumer, but via a SPoA for each Set.

Operation 1. Service B (valid a well for service C, for any consumer of service A) discovers service A from the NRF.

Operation 2. Service B gets both Set 1 and Set 2 in the discovery response.

Operation 3. Service B selects one Set (either 1 or 2) to perform a service A operation (e.g. a request) for a UE/session context (e.g. SUPI, PDU Session Id). Selection could be based in multiple criteria or even be random. In this example, Set 1 is selected, then service B sends the service A operation to the SPoA for Set1.

Operation 4. The operation will reach one instance within the Set. This may be done by means of a LB that selects the less loaded instance.

Operation 5. The execution of the service A operation may modify the UE/session context, that is then stored in the Storage Resource that is deployed for Set1.

Operation 6. Response of the update operation

Operations 7 and 8. Response of the service A operation

Then, a subsequent operation by service B for the same UE/session context shall reach the same Set. If a different Set is selected, this new operation may not take into account updated context by previous operation. This situation may be quite frequent, e.g. the AMF (also referred to as an AMF node/entity/functions/server) receives different interaction from the same UE (also referred to as a wireless device), for same or different DNN and NS SAI, then same or different PDU Sessions are created/selected . . . those values may identify a context that is modified and kept in the Storage Resource within the Set, that defines and state.

The same applies to any other service (e.g. service C) that may be required to operate on the same UE/session context. This is as well quite frequent, e.g. for Exposure services, for Rel-15, each/most NFs have defined an Exposure service, that may be required to provide access to other NFs to the data that is managed by the NF (also referred to as an NF node/entity/functions/server), then the Exposure service should access data that is owned and manipulated by other NF services. Another example, some services allow an external service to subscribe to receive notifications upon certain events/updates, then the external service should send this subscription to the same Set (i.e. the exact same service (or group of services) that are able to access the same Storage Resource).

Apart from that, in the context of the eSBA TR (ref [3]) there may be a requirement to achieve an independent management per each service, but sometimes this may not be possible as long as some defined services (in Rel-15) have some common data, that is accessed internally by implementation dependent interfaces. But, even though in Rel-15 some services are defined with those dependencies, how to provide operation on that shared data (by multiple services, at least two) may be unresolved.

In summary, it may be desirable to provide operations on the same UE/session context by accessing the same Storage Resource.

Some embodiments herein may provide a new element named service producer controller or service controller node that acts as a Front-End of the multiplicity of service producer instances in the system/network/deployment. There may be only one single logical service producer controller, but this does not preclude multiple instances being defined and hidden by e.g., a load-balancer or a DNS-based resolution service.

In the following disclosure, the term "Storage Resource Group" is used to refer to all the consumer instances that may be required to use the same Storage Resource, to be able to provide access to shared data, i.e. all consumer instances within a Set or within a Deployment Unit.

According to some embodiments disclosed herein, the Sets of instances may be registered to the new controller (instead of to the NRF), while the controller registers itself to the NRF with a single URI.

Then the controller may keep track of registered Sets and their availability and may select the very same Set for the operations that may be required to access the same UE/session context, in order to provide that the operations always access the fresh updated data.

Procedures proposed in the present disclosure are described with the following call flows.

Figure 3:
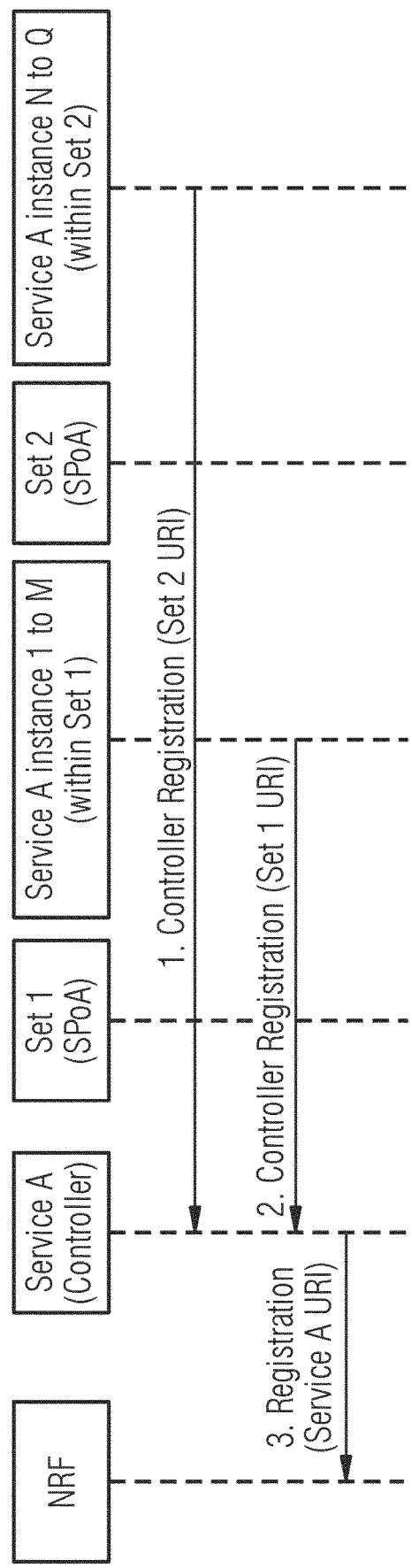
FIG. 3 is a message diagram illustrating instance registration with a service controller according to some embodiments of inventive concepts.

FIG. 3 illustrates a new registration to the controller.

A change is that only one SPoA, one URI is registered in the NRF as providing service A, while each Set may need to register to the controller rather than to the NRF. This is explained with respect to FIG. 3, where numbered operations do not need to go in any order, just numbered to ease description. Operations of FIG. 3 are discussed below:

Operation 1. Instances M to Q or service A are deployed in a Set (pool) offering as a single URI (e.g. of a LB). All the instances within the Set register a single URI is in the controller entity as the SPoA for Set 2. This registration may be referred to as "controller registration" since it is not the existent registration in the NRF, however, the mechanism is similar.

In fact, the service instances do not need to know whether they register to the NRF or to a controller, they could use exactly the same procedures and messages. In this sense this does not need to be standardized. This may allow inclusion in a deployment using a controller by Ericsson, while the service instances are by another vendor.

Operation 2. Similar to operation 1 for instances within Set 1.

Operation 3. Only one single URI is registered for service A, this corresponds to the entity that acts as the controller for this service A. Multiple instances of the controller could be instantiated, and then a single URI could be offered in the say way as for the Sets.

The controller registers into the NRF exactly as if it were a regular service A instance, then standardization may not be required.

In the following call flow, there is a Service Instance Set (SIS) of the consumer service, and two different SISs for the service producer.

For the SIS consumer, the Storage Resource is included in the figure, that has been omitted for simplicity in SIS1_Producer and SIS2_Producer. Moreover, for the SIS Producers a SPoA is offered, by e.g. a LB, this is equally excluded from the figure.

In the figure, it is considered optional the existence of a separated Storage Resource as an independent and external service. This is why the interactions with this element are marked as optional (dotted lines).

Figure 4:
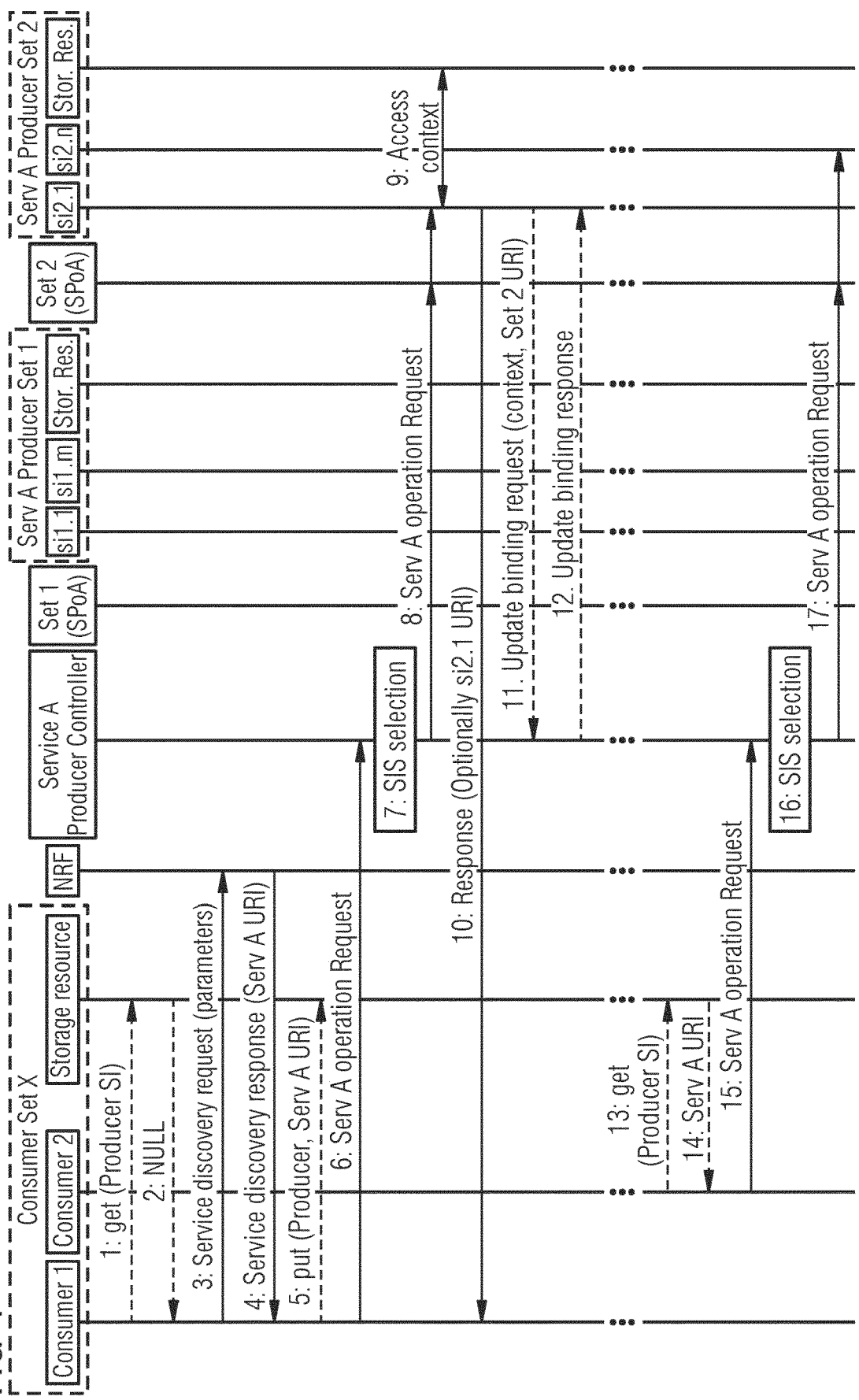
FIG. 4 is a message diagram illustrating set selection for a UE/session context according to some embodiments of inventive concepts.

FIG. 4 illustrates Selection of the right Set for a UE/session context. Operations of FIG. 4 are discussed below:

Operation 1. Consumer 1 wants to send a request to service A (producer), and then it first checks if the right address to use to contact that service is stored from a previous interaction.

Operation 2 In this example, the address is not stored.

Operation 3. Then the consumer needs to discovery the means to contact service A.

Operation 4. Discovery response includes the Serv A URI. This corresponds to the "Serv A producer controller", but from a consumer perspective the "Serv A producer controller" is just a service A.

Operation 5. The consumer may store the service A URI in the Storage Resource.

Operation 6. Consumer sends a Serv A operation request to the service A, using the URI received that corresponds to the "Serv A Producer Controller"

Operation 7. The controller receives the service A operation request, and needs to select to which Set of instances it is sent. First, it must check if there is a Set already assigned to the corresponding UE/session context. The UE/session context shall be included in the service A operation request, today it is considered an HTTP/REST interface, then it should be included in the HTTP body. E.g. if the operation is for SUPI-Y and for PDU Session Id-X, this should be included in the request. Then, the controller reads the request and needs to know which parameters should be used to identify a UE/session context, e.g. SUPI and PDU Session. Then based on those, it checks if there is already a Set assigned, checking a mapping that has to be kept in permanent memory (either internal or external).

If a Set is already assigned to that UE/session context, then the same Set is selected. If there is not a Set assigned yet, then the controller selects one from the available ones (in this case Set 1 and Set 2). The selection could be based on different criteria, e.g. load. Then, the controller keeps record of this assignment in permanent memory.

Operation 8. The controller forwards the service A operation request to the selected Set (in this case Set 2 SPoA) using registered URI. The forwarded request includes the URI of the consumer. Set 2 SPoA chooses one instance within this Set, this selection could be based in different criteria (e.g. load). Corresponding service A instance executes the request using the stored UE/session context in its Set Storage Resource.

Operation 9. The instance receiving the operation request accesses the stored context in order to be able to process the request. It may also need to manipulate part of the stored context.

Operation 10. The service A operation response is sent back to the consumer (either directly, as in the figure, or through the Set 2 SPoA). It may optionally include the URI of the specific instance within the Set that has managed the request, that could be used to minimize extra hops and establish a direct communication during the same procedure execution flow.

Operations 11 and 12. In case this UE/session context is created or deleted, then the controller has to either create or delete the corresponding mapping, in this case it is relevant that only when the operation has successfully performed the affected service instance informs back to the controller.

Operation 13. In a later stage, another consumer instance within the same Consumer Set wants to send a request to service A, then it first checks whether for that service A a contact URI is already available.

Operation 14. In this case, the service A URI is available (it was stored in operation 5), then it is provided to the consumer instance 2.

Operation 15. Consumer instance 2 sends a service A operation using stored URI, that corresponds to the controller.

Operation 16. The controller needs to select a Set. It needs to read corresponding parameters received in the request to be able to identify the UE/session context, and then check if it has already stored a mapping to any Set. In this case, this mapping has been stored in operation 11 (when it was created), then Set 2 (SPoA) is selected.

Operation 17. As in Operation 8, the controller forwards the request to Set 2 SPoA, which chooses one instance within this Set, this selection could be based in different criteria (e.g. load).

As explained above, in the context of the eSBA TR there may be a requirement to achieve an independent management per each service, but sometimes this may not be possible as long as some defined services (in Rel-15) have some common data, that is accessed internally by implementation dependent interfaces.

A possible solution for that problem is to not consider those services as independent from a management perspective, but fit those into a group. For example, if service A and service B have some data in common, (they are dependent to each other processing and updating of internal UE/session context), then they can be defined to be deployed always together as part of what may be referred to as a "Deployment Unit" DU.

This deployment unit may be provided in two or more instances of different service types, that then are deployed together and are single vendor. Since the service instances within the deployment unit share some data, they need to access same Storage Resource, and this may be addressed according to some embodiments disclosed herein.

A similar solution to what is described above applies, with some modifications as explained in following call flow.

Figure 5:
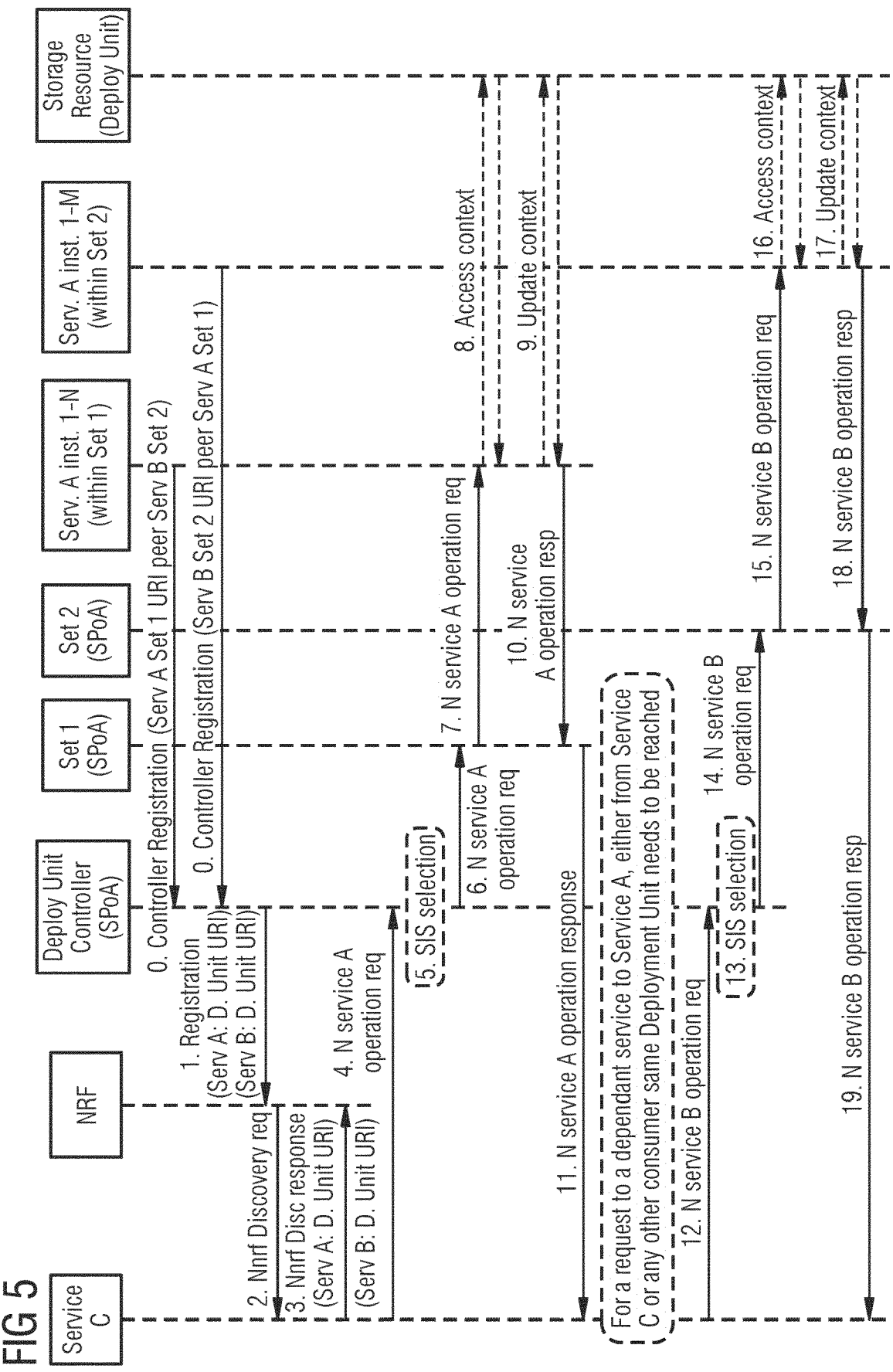
FIG. 5 is a message diagram illustrating set selection for a UE/session context for dependent services according to some embodiments of inventive concepts.

FIG. 5 illustrates selection of the right Set for a UE/session context for dependent services. Operations of FIG. 5 are discussed below:

Operation 0. Similar to operation 1 in FIG. 3 above. The difference is that now the controller acts as a controller for the whole Deployment Unit (DU), that involves two or more dependent services. Then, the controller keeps track of what services belong to the DU, and which Sets serve each service.

Another difference may be that in order to provide that both service A and B have access to the same Storage Resource, a deployment requirement may be defined: same Storage Resource must be shared by at least one Set of the dependent services (A and B in our example). Then service A Sets are peered with service B Sets (peered Set access to the same Storage Resource). Information about Set peers is provided at controller registration, e.g., in a form of naming conventions in the set URIs.

Operation 1. DU controller registers only its URI into the NRF, as the serving URI for all the services that belong to the DU. In this example, for services A and B.

Operations 2 and 3. Service C wants to contact service A, then it has to get its URI by NRF discovery. The DU URI is provided back for service A. If service C wants to use as well service B (in operation 11), then same DU URI is provided.

Operation 4. Service C sends a service A operation to the corresponding DU URI.

Operation 5. The DU controller needs to perform similar checks as in previous FIG. 4, operation 7, plus something else. In this case, the DU controller could receive requests for multiple services (A and B), that are identified by the same URI, while in the former case the URI of the controller only identifies one single service. Then, DU controller needs to identify the right service name (in the request), to forward the request to the right set.

Operations 6 to 11 are similar to FIG. 4, operations 8 to 10. FIG. 4 operations 11 and 12 may be applicable in this case as well, not included in the figure for simplicity.

Operation 12. Service C wants to execute a service B operation, that is dependent to service A. Then it sends the request to the URI received at discovery (operation 3), that corresponds to the same DU controller.

Operation 13. The controller performs same tasks as in FIG. 4, operation 16. The important difference is that in this case, the controller needs to select the set for service B (for the corresponding UE/session context) based on the assigned set for dependent services (in this case service A). Only a peered set could be selected, in order to have access to the same Storage Resource.

Operations from 14 to 19. They are similar to operations 6 to 11 in this flow.

Some embodiments of inventive concepts disclosed herein may provide one or more of the following advantages:

In the case of services (e.g. A and B) that have some dependencies (i.e., they share data), that are defined as a group (Deployment Unit), some embodiments may provide a solution to be able to access from the different services within the Deployment Unit to the same Storage Resource. This may allow that the Deployment Unit has independent LCM.

Some embodiments may provide that operations on the same UE/session context access the same Storage Resource, where this UE/session context is stored. Otherwise, any transaction that requires information about the current state may not work (and in 5GC most, if not all, transactions may be required to continue from a previous state).

Some embodiments may not impose any constraints on how the services are organized in sets and how the sets are scaled, and also may allow use of other methods to shorten the communication latency, e.g., based on direct communication between the service instances.

As discussed with respect to FIGS. 3-5, 11, 14, 15, and 16, herein, a service controller (also referred to as a service producer controller and/or a control service node) may act as a font end of a multiplicity of service producer instances (also referred to as service instance sets or service instance set nodes). There may only be one single logical service producer controller, but this does not preclude multiple instances from being defined and hidden by e.g., a load-balancer or a DNS-based resolution service.

Instead of registering the sets of instances to the NRF, the sets of instances can be registered to the new controller (service controller) which registers itself to the NRF with a single URI. Then, the controller keeps track of registered sets and their availability, and selects the very same set for the operations that require to access the same UE/session context, in order to ensure that the operations always access the fresh updated data.

Operators may require that even though the instances within a set could be by a single vendor, there may be multiple sets (for the same service type) by different vendors. One concern is that a service provided by a set that is supported by one vendor may become unavailable (e.g., failure, maintenance . . . ), and another set supporting the service may be provided by another vendor. This may require providing a way for a consumer to continue using a service when a new producer of Set1 (a first service instance set) takes over a former producer Set2 (a second service instance set). Potentially Set1 and Set2 are by different vendors. Taking into account that each set may own a service storage resource as described with respect to FIG. 1 above, it may be desirable to provide a way to store required context in the new service storage resource.

Some embodiments herein may provide a service storage resource (SSR), that is, a storage node that is common for all the service instances for the same service type, even though they may be deployed in multiple sets (by the same or different vendors).

The service controller node (a common entity for all the service instances) may provide functionality to be able to identify when a set is unavailable and then select an alternative set to take over the context and services provided by the unavailable set. Alternatively, instead of identifying directly that the set is unavailable, the service controller may select an alternative set due to reasons such as maintenance, load rebalancing, etc. reasons.

According to some embodiments, the following advantages may be provided:

Operators' requirements to deploy multiple sets (for the same service type) by different vendors may be supported.

An alternative Set2 (for the same service type) in case Set1 is unavailable for any reason (e.g. maintenance, upgrade, set failure . . . ) may be selected. By this, A vendorX service may be allowed to be upgraded while another vendorY keeps providing service.

A critical failure (by a vendor) may be avoided that affects a service in a network, as long as another vendor service could be used.

SSR may qualify as a DB to be provided by CNA infrastructure, which may be a preference by operators.

The FIG. 1 example provided above maybe updated to reflect that it is not only possible to provide a SPoA in front of the pool of instances, but alternatively the consumer may select one from the pool. This is a more general case that is discussed with respect to FIG. 6.

Figure 6:
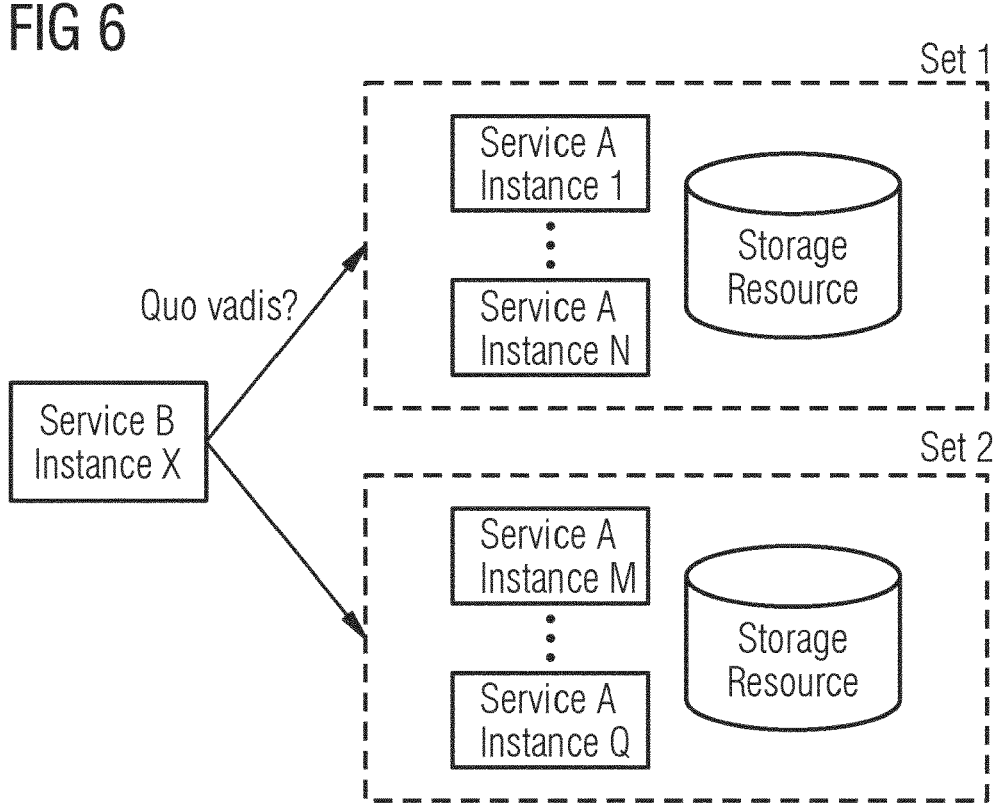
FIG. 6 is a block diagram illustrating service A instances deployed in two sets (also referred to as groups) where a service B selects one in each pool or a SPoA is provided for each pool according to some embodiments of inventive concepts.

FIG. 6 illustrates service A instances deployed in two sets, where either service B selects one in each pool or a SPoA is provided for each pool.

Figure 7:
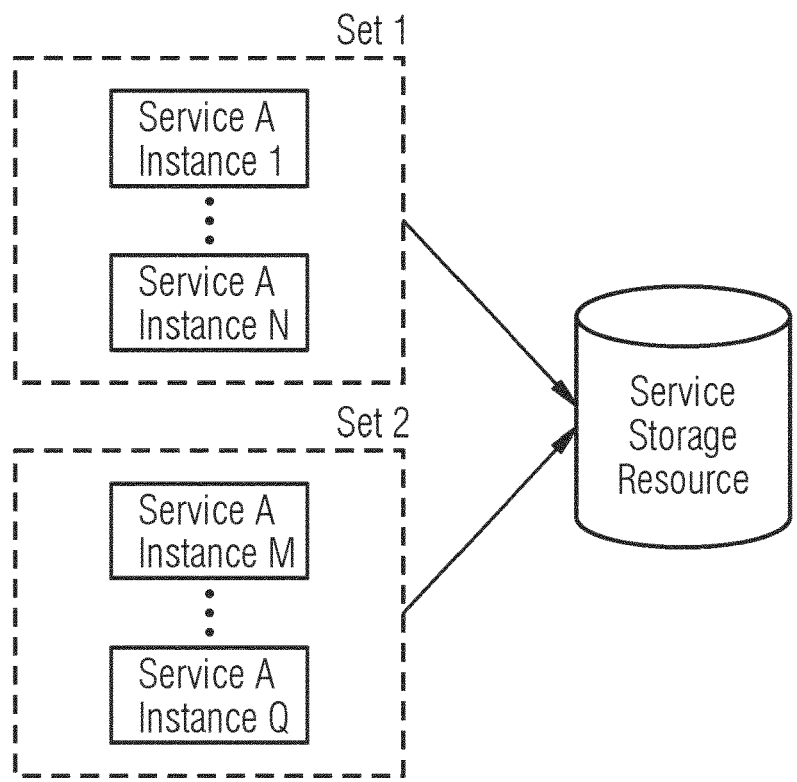
FIG. 7 is a block diagram illustrating a service storage resource according to some embodiments of inventive concepts.

The term "Service Storage Resource" (SSR) is used to refer to a storage node that is common for all the service instances for the same service type, even though they may be deployed in multiple sets (by same of different vendors), as illustrated by FIG. 7, which illustrates New Service Storage Resource.

The SSR may need to span multiple DC (Data Centers) in order to provide Geo redundancy support.

The SSR may be a specific database DB for each service, or all the data required to be stored by a group (or all) the services deployed in a network may use the same DB. In the following description, the term SSR refers to both scenarios.

Context data that is stored in the SSR and that is expected to be recovered may be standardized so that the context data is understood by different vendor service instances. The SSR may be considered part of 5GC UDR, and then the standardized context data may be defined as data to be stored in 5GC UDR. For this to occur, a new data set may be defined and then Nudr may be used. But as an alternative, the SSR may be considered to be an independent DB, and then decision about the new interface will be taken in 3GPP stage 3.

Figure 8:
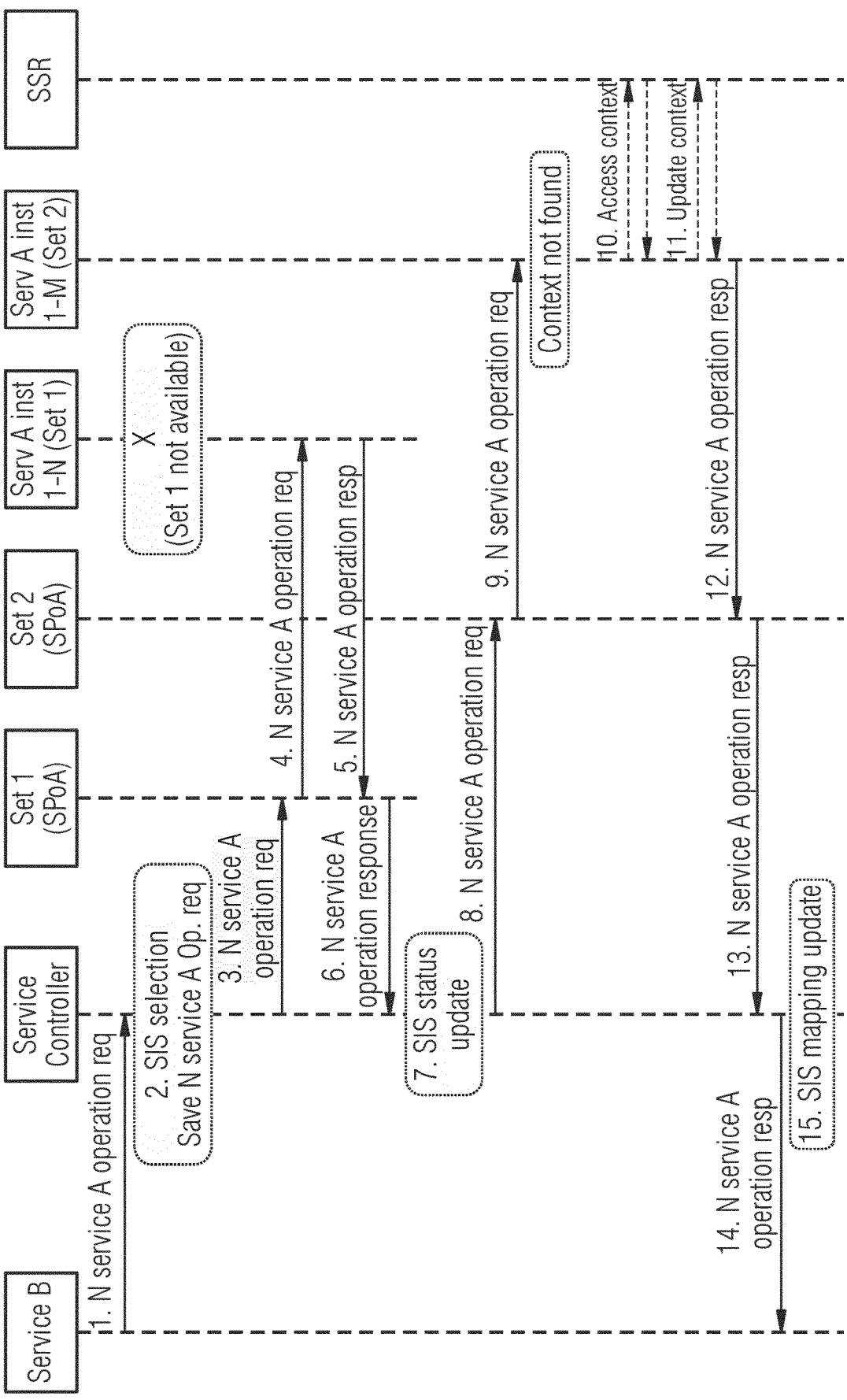
FIG. 8 is a message diagram illustrating a set failure and access to a second set according to some embodiments of inventive concepts.
Figure 9:
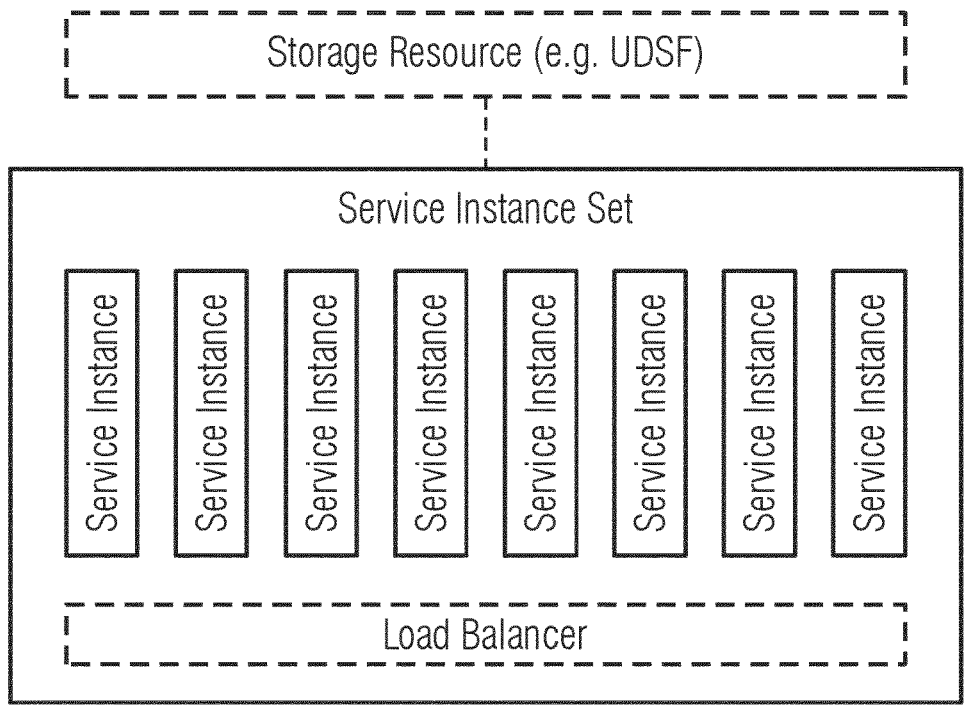
FIG. 9 is a block diagram illustrating a service instance set with a shared storage resource and an optional load balancer.
Figure 10:
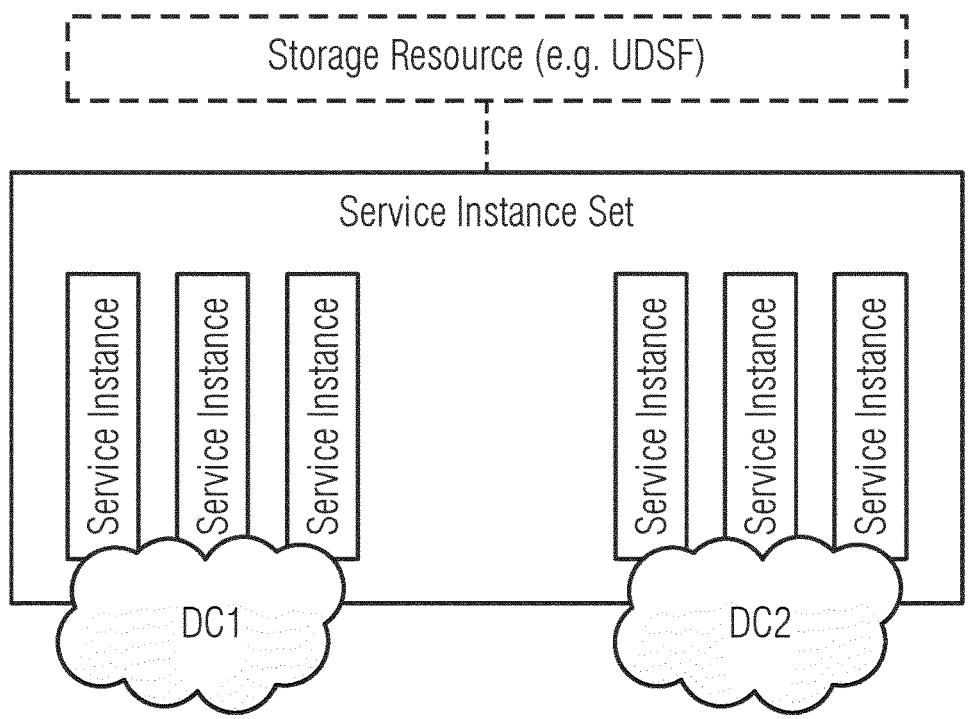
FIG. 10 is a block diagram illustrating a service instance set that spans across multiple data centers.

FIG. 8 illustrates an embodiment of how context data may be accessed. FIG. 8 shows an example sequence diagram depicting a scenario where the service controller selects an alternative Set 2 when former Set 1 is considered unavailable (e.g., Set 1 failure).

Operations of FIG. 8 are discussed below.

Operation 1. Service B (a consumer of service A) requests a service A operation from the service controller. For that it sends an operation request to the Address received at Registration. (See discussion of FIGS. 4-5 for details about this part).

Operation 2. Service controller node selects the set where the corresponding context is stored, using Context Id. In this example, Set 1 (a first service instance set) is selected. (See FIGS. 4-5 descriptions for details about this part).

Operation 3. Service controller node forwards the operation received to the Set 1 but also stores it until the response is received. Any instance of Set 1 is potentially reachable, one instance in the set may be selected based on different criteria (e.g. load). (See discussion of FIGS. 4-5 for details about this part).

Operation 4. One instance in Set 1 is attempted to be contacted, however, Set 1 is unavailable, illustrated by the symbol X (Set 1 not available) (multiple reasons are possible).

Operation 5. Either an error response is received (permanent error), or there is no response. There may be options for retry in this point, but eventually the set is considered unreachable.

Operation 6. When the set is considered unreachable an error response is received by the controller.

Operation 7. Service controller node updates the status of Set 1 to be set as unreachable. Depending on the error (or lack of response received), multiple status could be defined.

Operation 8. Service controller node was informed at registration (see discussion of FIG. 5 for details about this part) that there is a second set that offers the same service A, then the controller forwards the same operation to Set 2 (a second service instance set).

Operation 9. One instance within Set 2 is reached that realizes that the context that is targeted by the received service operation is not available.

Operation 10. Context data is accessed from SSR. New instance of service A in Set 2 executes its business logic using this data. That is, state is recovered from that last Context stored.

Operation 11. As a result of service A operation execution, the Context may be modified, if so, this is updated in SSR.

Operations 12, 13, 14. Successful response back.

Operation 15. The service controller node updates its internal context mappings, i.e., Set 2 becomes the owner of the given context.

Note that FIG. 8 depicts a scenario when the context becomes unavailable in a service set (potentially due to some failures related to the networking infrastructure or the set itself, or if the set is directly defined as unavailable, e.g. by an operation and management O&M node).

A similar method as in Operations 7 to 15 of FIG. 8 could also be performed based on different triggers to service controller directly (instead of identifying in Operation 5 that the set is not available, the controller could be informed by different triggers), i.e., an O&M trigger, or load information received, etc.

The separation of service logic and data, which may be an assumption for some embodiments described herein may facilitate applying cloud-native design principles for services in the SBA domain.

In order to be able to support multi vendor service instances of the same service type, and be able to recover network service, some embodiments described herein may store context data in a standardized way and/or in a common storage for those instances, even though some may be from a different vendor, and then provide a way to support reaching an alternative Set2 when Sel1 is not reachable.

Operations of service controller 1101 (also referred to as a service controller node/entity/function/server) will now be discussed with reference to the flow chart of FIG. 14 according to some embodiments of inventive concepts. For example, modules may be stored in memory 1105 of FIG. 11, and these modules may provide instructions so that when the instructions of a module are executed by processor 1103, processor 1103 performs respective operations of the flow chart of FIG. 14.

At block 1401, processor 1103 may receive (through network interface 1107) instance registrations for respective instances of a first group of instances of a service provided within the communication network, and each of the instance registrations for the instances of the first group may include a same first address. Operations of block 1401 may be performed as discussed above with respect to operation 1 of FIG. 3.

At block 1403, processor 103 may receive (through network interface 1107) instance registrations for respective instances of a second group of instances of the service provided within the communication network, and each of the instance registrations for the instances of the second group may include a same second address, with the first and second addresses being different. Operations of block 1403 may be performed as discussed above with respect to operation 2 of FIG. 3.

At block 1405, processor 1103 may transmit (through network interface 1107) a service registration for the first and second groups of instances of the service to a registration node, with the service registration being transmitted based on receiving the instance registrations for the first and second groups of instances. The service registration may include a service address, with the service address being different than the first address, and with the service identifier being different than the second address. Operations of block 1405 may be performed as discussed above with respect to operation 3 of FIG. 3.

At block 1407, processor 1103 may receive (through network interface 1107) a first operation request for the service from a consumer node of the communication network, wherein the first operation request includes the service address and a context for a device, session, and/or subscription. Operations of block 1407 may be performed as discussed above with respect to operation 6 of FIG. 4.

At block 1409, processor 1103 may select the first address responsive to receiving the operation request for the service. Operations of block 1409 may be performed as discussed above with respect to operation 7 of FIG. 4.

At block 1411, processor may transmit a second operation request for the service from the service controller to an access (SPoA) node for the first group of instances of the service responsive to selecting the first address. The second operation request may include the first address and the context for the device, session, and/or subscription. Operations of block 1411 may be performed as discussed above with respect to operation 8 of FIG. 4. At block 1413, processor may store a mapping between the context and the first address, for example, based on the selecting of block 1409.

At block 1415, processor 1103 may receive (through network interface 1107) a first operation response from an instance of the first group of instances, with the first operation response corresponding to the second operation request, and with the first operation response relating to the context for the device, session, and/or subscription. Operations of block 1415 may be performed as discussed above with respect to operation 10 of FIG. 4.

At block 1417, processor 1103 may transmit (through network interface 1107) a second operation response to the consumer device, with the second operation response corresponding to the first operation response, and with the second operation response relating to the context for the device, session, and/or subscription. Operations of block 1417 may be performed as discussed above with respect to operation 10 of FIG. 4.

At block 1419, processor 1103 may delete the mapping between the context and the first address responsive to the first operation response of block 1415 including an indication of deletion of the context.

According to some other embodiments, operation responses may be transmitted directly from instances to consumer nodes bypassing the service controller, so that operations 1415, 1417, and 1419 may be omitted. In such embodiments, processor 1103 may receive (through network interface 1107) a request from an instance of the first group of instances, with the request including an indication of deletion of the context. Responsive to receiving such a request, processor 1103 may delete the mapping between the context and the first address. Such operations are discussed above with respect to operation 11 of FIG. 4.

Figure 14:
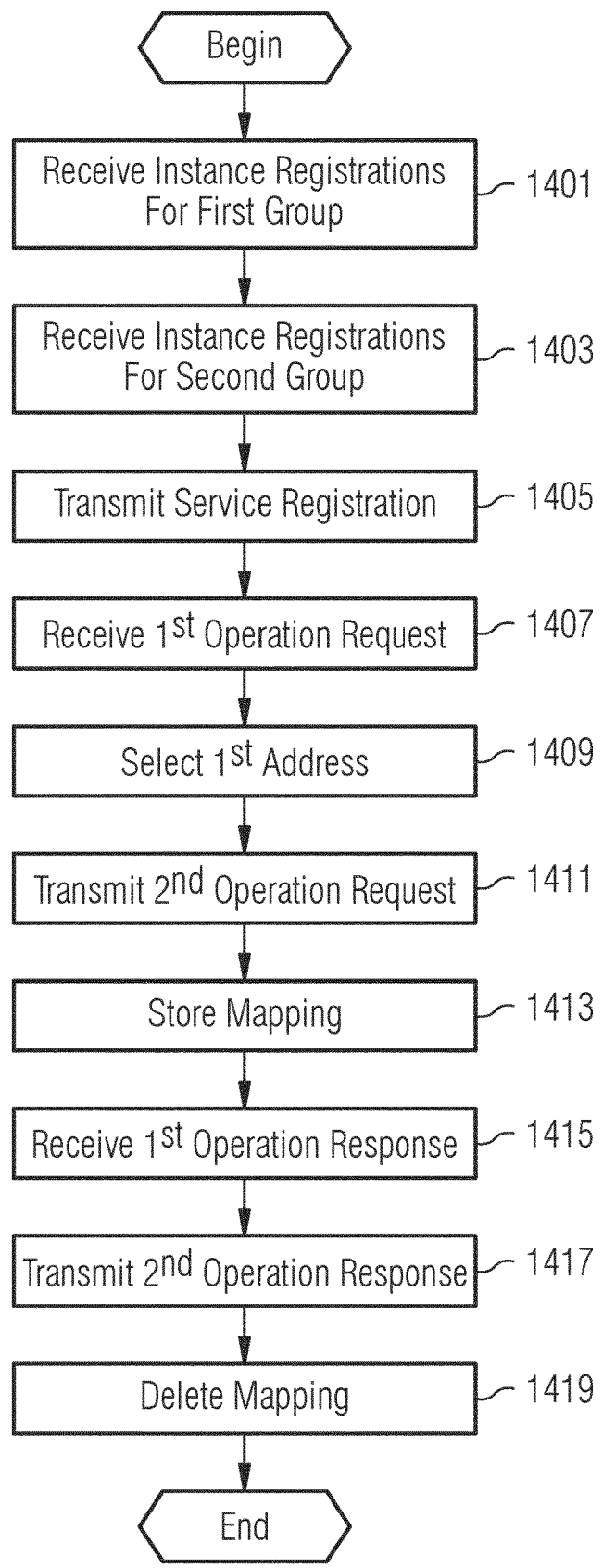
FIGS. 14-17 are flow charts illustrating operations of a service controller according to some embodiments of inventive concepts.

Various operations from the flow chart of FIG. 14 may be optional with respect to some embodiments of service controllers and related methods. Regarding methods of some embodiments, for example, operations of blocks 1407, 1409, 1411, 1413, 1415, 1417, and 1419 of FIG. 12 may be optional.

Operations of service controller node/entity/function/server 1101 will now be discussed with reference to the flow chart of FIG. 15 according to some embodiments of inventive concepts. For example, modules may be stored in memory 1105 of FIG. 1, and these modules may provide instructions so that when the instructions of a module are executed by processor 1103, processor 1103 performs respective operations of the flow chart of FIG. 15.

At block 1501, processor 1103 may receive (through network interface 1107) instance registrations for respective instances of a service provided within the communication network. At block 1503, processor 1103 may transmit (through network interface 1107) a service registration for the instances of the service to a registration node, with the service registration being transmitted based on receiving the instance registrations, with the service registration including a service address, and with the service address being different than instance addresses of the respective instances. At block 1505, processor 1103 may receive (through network interface 1107) a first operation request for the service from a consumer node of the communication network, with the first operation request including the service address and a context for a device, session, and/or subscription. At block 1507, processor 1103 may select a respective one of the instances of the service responsive the operation request for the service. At block 1509, processor 1103 may transmit (through network interface 1107) a second operation request for the service from the service controller to the instance selected responsive to the operation request, with the second operation request including the context for the device, session, and/or subscription.

Figure 15:
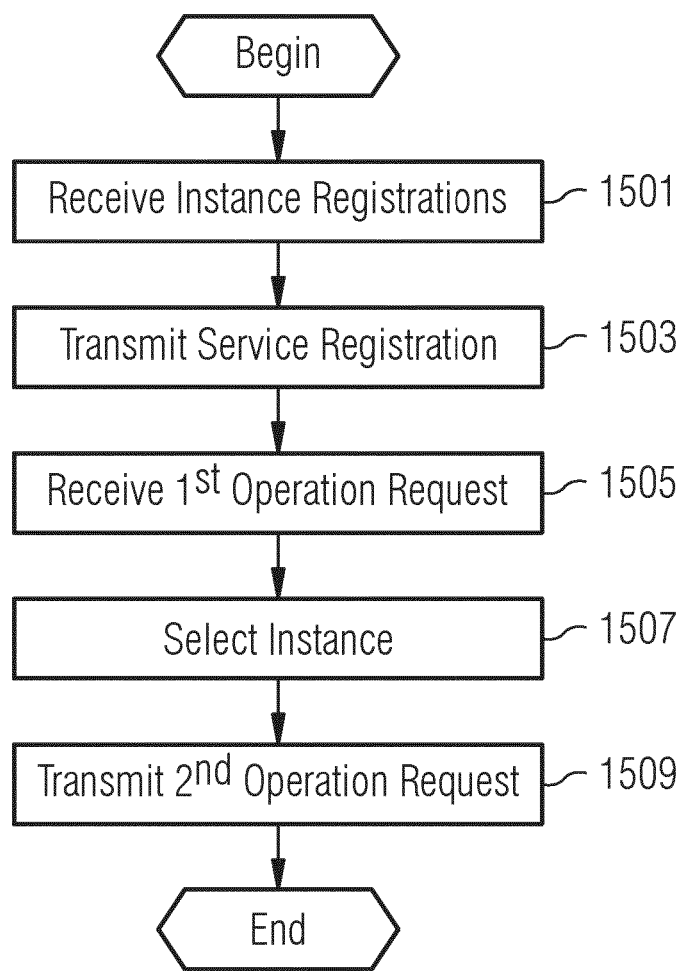

Various operations from the flow chart of FIG. 15 may be optional with respect to some embodiments of service controllers and related methods.

Operations of service controller node/entity/function/server 1101 will now be discussed with reference to the flow chart of FIG. 16 according to some embodiments of inventive concepts. For example, modules may be stored in memory 1105 of FIG. 11, and these modules may provide instructions so that when the instructions of a module are executed by processor 1103, processor 1103 performs respective operations of the flow chart of FIG. 14.

At block 1601, processor 1103 may receive (through network interface 1107) instance registrations for respective instances of a first group of instances of a first service provided within the communication network. Each of the instance registrations for the instances of the first group may include a first address. Operations of block 1601 may be performed as discussed above with respect to operation 0 of FIG. 5.

At block 1603, processor 1103 may receive (through network interface 1107) instance registrations for respective instances of a second group of instances of a second service provided within the communication network. Each of the registrations for the instances of the second group may include a second address, the first and second addresses may be different, and the first and second services may be different. Operations of block 1603 may be performed as discussed above with respect to operation 0 of FIG. 5.

At block 1605, processor 1103 may transmit a service registration for the first and second groups of instances, wherein the service registration is transmitted based on receiving the instance registrations for the first group of instances and the second group of instances. The service registration may include a service address, the service address may be different than the first address, and the service address may be different than the second address. Operations of block 1605 may be performed as discussed above with respect to operation 1 of FIG. 5.

At block 1607, processor 1103 may receive (through network interface 1107) a first operation request for the first service from a consumer node of the communication network. The first operation request may include the service address and a context for a device, session, and/or subscription. Operations of block 1607 may be performed as discussed above with respect to operation 4 of FIG. 5.

At block 1609, processor may select the first address responsive to receiving the first operation request for the first service. Operations of block 1609 may be performed as discussed above with respect to operation 5 of FIG. 5.

At block 1611, processor 1103 may transmit (through network interface 1107) a second operation request for the first service from the service controller to an access node for the first group of instances of the first service responsive to selecting the first address. The second operation request may include the first address and the context for the device, session, and/or subscription. Operations of block 1611 may be performed as discussed above with respect to operation 6 of FIG. 5.

At block 1613, processor 1103 may provide a mapping between the context and the first address and the between the context and the second address responsive to selecting the first address.

At block 1615, processor 1103 may receive (through network interface 1107) a first operation request for the second service. The first operation request for the second service may include the service address and the context for the device, session, and/or subscription. Operations of block 1615 may be performed as discussed above with respect to operation 12 of FIG. 5.

At block 1617, processor 1103 may select the second address responsive to receiving the first operation request for the second service. Processor 1103, for example, may select the second address based on the mapping of block 1113. Operations of block 1617 may be performed as discussed above with respect to operation 13 of FIG. 5.

At block 1619, processor 1103 may transmit (through network interface 1107) a second operation request for the second service from the service controller to an access (SPoA) node for the second group of instances of the second service responsive to selecting the second address. The second operation request may include the second address and the context for the device, session, and/or subscription. Operations of block 1619 may be performed as discussed above with respect to operation 14 of FIG. 5.

Figure 16:
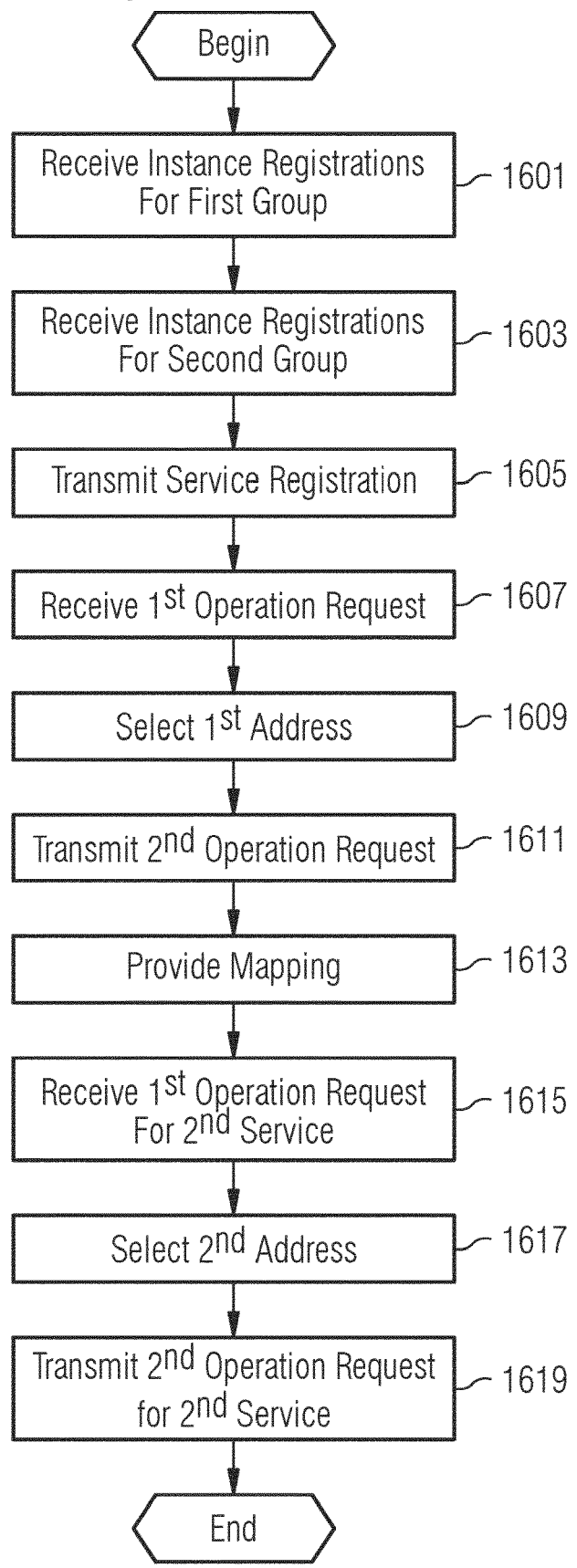

Various operations from the flow chart of FIG. 16 may be optional with respect to some embodiments of service controllers and related methods. Regarding methods of some embodiments, for example, operations of blocks 1607, 1609, 1611, 1613, 1615, 1617, and 1619 of FIG. 16 may be optional.

According to some embodiments, the service controller may be collocated in a Unified Data Management UDM node and/or a UDR node so that embodiments herein may be performed in the UDM and/UDR node. In such embodiments as applied to FIG. 3, for example, the controller registrations of operations 1 and 2 may be replaced by a registration/update of information in the UDM and/or Unified Data Repository UDR.

According to some embodiments, a service instances may not need to register an SPoA for the respective set, but instead, the service instances may register each individual address in the service controller. The service controller may then select one of the instances within the set based on different criteria (e.g., load). In such embodiments, a separate SPoA may not be needed for the set, and it may be up to the service controller to perform selection of any instance within the set.

According to some embodiment, mapping may not be required. For example, the service controller may be able to uniquely identify a corresponding set based on parameters (e.g., context) received (e.g., by a hash).

Operations of service controller node/entity/function/server 1101 will now be discussed with reference to the flow chart of FIG. 17 according to some embodiments of inventive concepts. For example, modules may be stored in memory 1105 of FIG. 11, and these modules may provide instructions so that when the instructions of a module are executed by processor 1103, processor 1103 performs respective operations of the flow chart of FIG. 17.

At block 1701, processor 1103 may receive (through network interface 1107) an operation request for a service. The operation request may be for a consumer node of a communication network. The operation request may include a context identifier referring to a context related to the operation request. The context identifier may be associated with a device, a session, and/or a subscription. The operation request may be received from the consumer node. Operations of block 1701 may be performed as discussed above with respect to operation 1 of FIG. 8.

At block 1703, processor 1103 may select a first service instance set. According to some embodiment, the selection may be based on at least one of a load, a pre-configuration, and/or a random selection. According to some other embodiments, a mapping between the context identifier and the first service instance set may be stored, and the first service instance set may be selected based on the operation request including the context identifier and based on the mapping between the context identifier and the first service instance set. The first service instance set may comprise a first plurality of instances of the service. Operations of block 1703 may be performed as discussed above with respect to operation 2 of FIG. 8.

At block 1705, processor 1103 may forward (through network interface 1107) the operation request to the first service instance set. The forwarding of the operation request may be responsive to selecting the first service instance set (block 1703). The first service instance set may be identified by the service controller 1101 as handling the context related to the operation request. The forwarding of the operation request may include forwarding the operation request to a first access node (such as a single point of access (SPoA) node) for the first service instance set. Processor 1103 may save the operation request for the service in memory after forwarding the operation request to the first service instance set. Operations of block 1703 may be performed above as discussed above with respect to operation 3 of FIG. 8.

At operation 1709, processor 1103 may determine that the first service set instance is unreachable and/or unavailable. Determining that the first service set instance is unreachable and/or unavailable may be based on receiving an error response from the first service instance set corresponding to the operation request for the service. The error response may include the context identifier. In other embodiments, determining that the first service set instance is unreachable and/or unavailable may be based on failure to receive an operation response from the first instance set corresponding to the operation request for the service. In other embodiments, determining that the first service set instance is unreachable and/or unavailable may be based on load information relating to the first service instance set and/or based on information received from an operation and maintenance node of the communication network. In some embodiments, determining that the first service set instance is unreachable and/or unavailable may be based on an internal trigger, and/or determining that the first service instance set is unreachable/unavailable based on load reaching a threshold. In further embodiments, determining that the first service set instance in unreachable and/or unavailable may include at least one of determining that the first service instance set is unreachable/unavailable based on failure to receive a response to the operation request from the first service instance set, determining that the first service instance set is unreachable/unavailable based on receiving an error message in response to forwarding the operation request to the first service instance set, determining that the first service instance set is unreachable/unavailable based on a notification received from an operation and maintenance node, determining that the first service instance set is unreachable/unavailable based on an internal trigger, and/or determining that the first service instance set is unreachable/unavailable based on load reaching a threshold. Operations of block 1709 may be performed as discussed above with respect to operation 6 of FIG. 8.

At block 1711, processor 1103 may, responsive to determining that the first service set instance is unreachable and/or unavailable, select a second service instance set as a candidate to handle the context related to the operation request.

At block 1713, processor 1103 may forward (through network interface 1107) the operation request for the service to the second service instance set based on selecting the second service instance set. The forwarding of the operation request may include forwarding the operation request to a second access node (such as a single point of access (SPoA) node) for the second service instance set. The forwarding of the operation request may comprise forwarding the operation request from memory (see block 1705) to the second service instance set. Operations of block 1713 may be performed as discussed above with respect to operation 8 of FIG. 8.

At block 1715, processor 1103 may, after forwarding the operation request for the service to the second service instance set, receive an operation response from the second service instance set. The operation response may include the context identifier. The mapping operation of block 1707 may further include mapping between the context identifier and the second service instance set. The mapping operation may be responsive to receiving the operation response from the second service instance set. The mapping operation may be performed above as discussed above with respect to operation 15 of FIG. 8. Operations of block 1715 may be performed as discussed above with respect to operation 13 of FIG. 8.

At block 1717, processor 1103 may forward (through network interface 1107) the operation response to the consumer node. Operations of block 1717 may be performed as discussed above with respect to operation 14 of FIG. 8.

At block 1719, processor 1103 may receive a second operation request including the context identifier after storing the mapping between the context identifier and the second service instance set. Processor 1103 may select the second service instance set for the second operation request based on the second operation request including the context identifier and based on the mapping between the context identifier and the second service instance set and forward (through interface 1107) the second operation request for the service to the second service instance set responsive to selecting the second service instance set.

According to some embodiments, processor 1103 may receive instance registrations for respective instances of an instance set. For example, the processor 1103 may receive instance registrations for respective instances of the first plurality of instances of the first instance set and for respective instances for the second plurality of instances of the second instance set. Each of the instance registrations for the instances of the first service instance set includes a same first address. Each of the instance registrations for the instances of the second service instance set includes a same second address. Forwarding the operation request to the first service instance set at block 1705 may use the first address. Forwarding the operation request to the second service instance set at block 1713 may use the second address.

Figure 17:
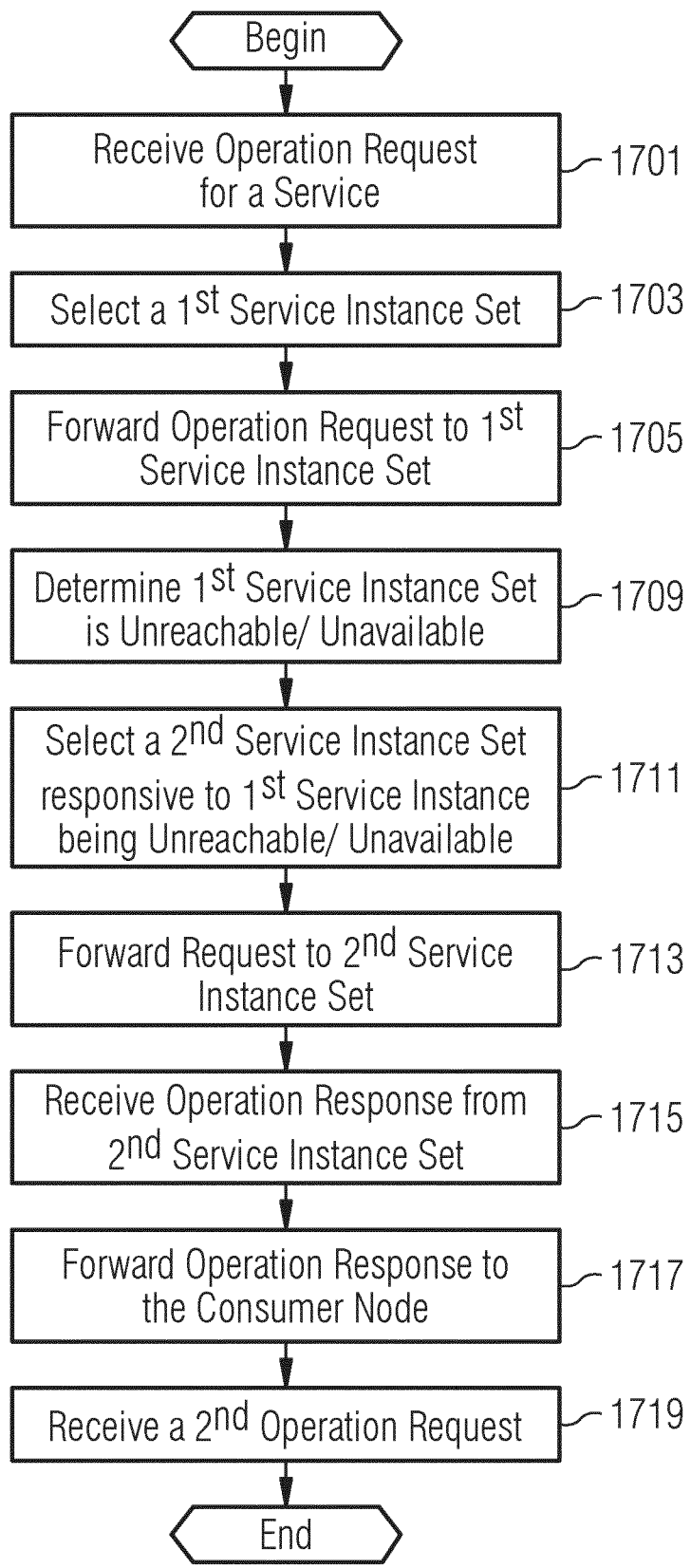

Various operations from the flow chart of FIG. 17 may be optional with respect to some embodiments of service controllers and related methods. Regarding methods of some embodiments, for example, operations of blocks 1703, 1707, 1715, 1717, and 1719 of FIG. 17 may be optional.

Operations of service instance set/entity/function/server 1201 will now be discussed with reference to the flow chart of FIG. 18 according to some embodiments of inventive concepts. For example, modules may be stored in memory 1205 of FIG. 12, and these modules may provide instructions so that when the instructions of a module are executed by processor 1203, processor 1203 performs respective operations of the flow chart of FIG. 18. The service instance set 1201 may include a plurality of instances of a service.

At block 1801, processor 1203 may receive (through network interface 1207) an operation request for a service from a service controller 1201. The request may include a context identifier. The context identifier may be associated with a device, a session, and/or a subscription. The operation request may be received from the service controller 1101 through an access node. Operations of block 1801 may be performed as discussed above with respect to operation 9 of FIG. 8.

At block 1803, processor 1203 may determine that context data is not available locally at the service instance set. At block 1805, the processor 1203 transmits (through network interface 1207) a context data request to a service storage resource node 1301. The request may include the context identifier. The context identifier may be one of a plurality of context identifiers that correspond to the context data. The context data request may be transmitted responsive to receiving the operation request. According to some embodiments, the context data request may be transmitted responsive to receiving the operation request and responsive to determining that the context data is not available locally. Operations of block 1805 may be performed as discussed above with respect to operation 10 of FIG. 8.

At block 1807, processor 1203 may, after transmitting the context data request, receive a context data response from the service storage resource node 1301. The context data response may include context data corresponding to the context identifier. The context data response may include the context identifier. Operations of block 1807 may be performed as discussed above with respect to operation 10 of FIG. 8.

At block 1809, processor 1203 may, after receiving the context data response including the context data, modify the context data based on the operation request to provide updated context data corresponding to the context identifier.

At block 1811, processor 1203 may transmit (through network interface 1207) the updated context data to the service storage resource node 1301. Operations of block 1811 may be performed as discussed above with respect to operation 11 of FIG. 8.

At block 1813, processor 1203 may receive an updated context response from the service storage resource node 1301.

At block 1815, processor 1203 may transmit (through network interface 1207) an operation response to the service controller 1101 based on the operation request and based on the context data. The operation response may include the updated context response. The operation response may be transmitted through the access node.

Figure 18:
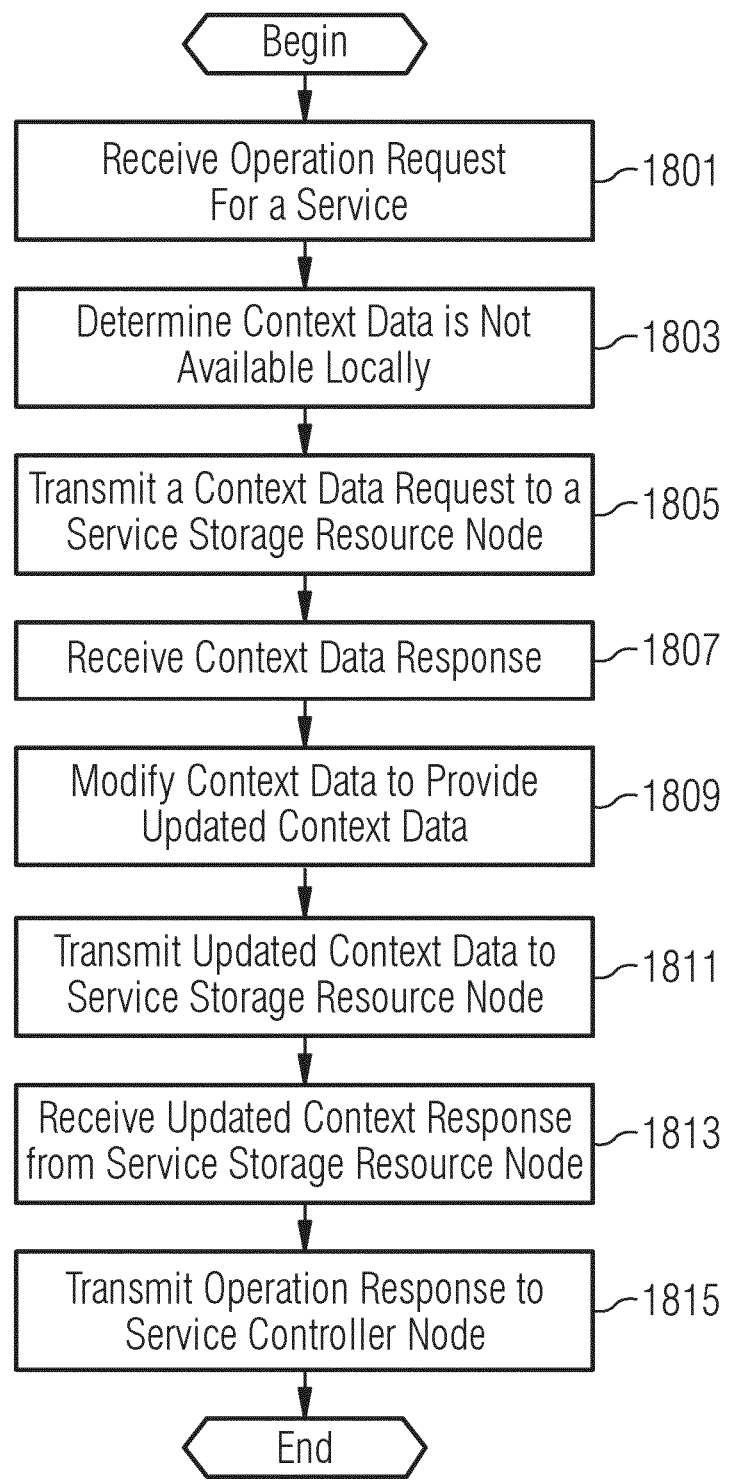
FIG. 18 is a flow chart illustrating operations of a service instance set according to some embodiments of inventive concepts.

Various operations from the flow chart of FIG. 18 may be optional with respect to some embodiments of service controllers and related methods. Regarding methods of some embodiments, for example, operations of blocks 1809, 1811, and 1813 of FIG. 18 may be optional.

Operations of service storage resource node/entity/function/server 1301 will now be discussed with reference to the flow chart of FIG. 19 according to some embodiments of inventive concepts. For example, modules may be stored in memory 1305 of FIG. 13, and these modules may provide instructions so that when the instructions of a module are executed by processor 1303, processor 1303 performs respective operations of the flow chart of FIG. 19.

At block 1901, processor 1303 may receive (through network interface 1307) context data from a first service instance set. The context data may be received with a context identifier. The first instance set may include a first plurality of instances of a service.

At block 1903, processor 1303 may receive a context data request from a second service instance set. The second service instance set may include a second plurality of instances of the service. Operations of block 1903 may be performed as discussed above with respect to operation 10 of FIG. 8.

At block 1905, processor 1303 may transmit (through network interface 1307) a context data response to the second service instance set. The context data response may be transmitted in response to receiving the context data request. The context data response may include the context identifier. The context data response may include at least a portion of the context data.

At block 1907, processor 1303 may receive (through network interface 1307) an update context request from the second service instance set after transmitting the context data response. The update context request may include a second context identifier. The second context identifier may be different from the context identifier (i.e., the first context identifier) received with the context data in block 1903. Operations of block 1907 may be performed as discussed above with respect to operation 11 of FIG. 8.

At block 1909, processor 1303 may update the context data, which may be the original context data. The updating of the context data may be responsive to receiving the update context request to provide updated context data.

At block 1911, processor 1303 may transmit (through network interface 1307) an update context response to the second service instance set response to receiving the update context request.

Figure 19:
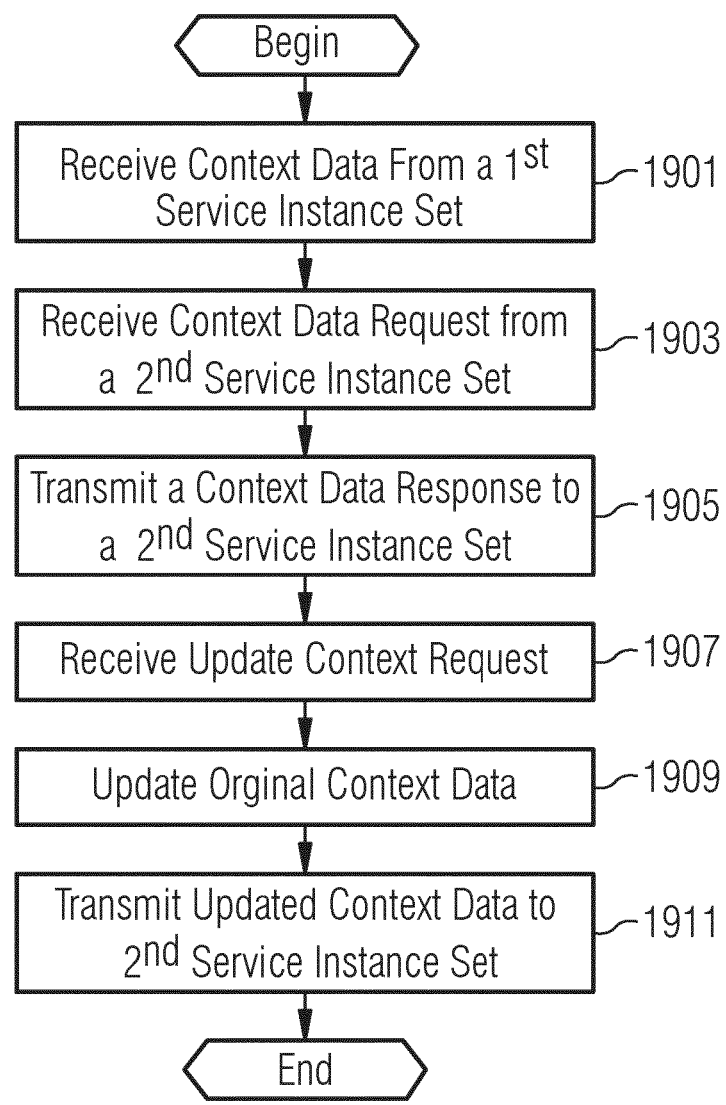
FIG. 19 is a flow chart illustrating operations of a service storage resource node according to some embodiments of inventive concepts.

Various operations from the flow chart of FIG. 19 may be optional with respect to some embodiments of service storage resource nodes and related methods. Regarding methods of some embodiments, for example, operations of blocks 1907, 1909, and 1911 of FIG. 19 may be optional.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts.

Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

List of Abbreviations:

| Abbreviation | Explanation |
| --- | --- |
| 3GPP | 3rd. Generation Partnership Project |
| 5GC | 5th Generation Core Network |
| AMF | Access and Mobility Management Function |
| API | Application Programming Interface |

-continued

| Abbreviation | Explanation |
|---|---|
| CN | Core Network |
| CNA | Cloud Native Architecture |
| DC | Data Center |
| DNN | Data Network Name |
| DNS | Domain Name Server |
| LB | Load Balancer |
| LCM | Life Cycle Management |
| NF | Network Function |
| NRF | Network Repository Function |
| NSSAI | Network Slice Selection Assistance Information |
| PDU | Protocol Data Unit |
| SBA | Service based Architecture |
| SIS | Service Instance Set |
| SPoA | Single Point of Access |
| SUPI | Subscriber Permanent Identifier |
| UDSF | Unstructured Data Storage Function |
| UDR | User Data Repository |
| UE | User Equipment |
| URI | Uniform Resource Identifier |

The invention claimed is:

1. A method of operating a service controller of a communication network, the method comprising:
receiving an operation request for a service, wherein the operation request is for a consumer node of the communication network, and wherein the operation request includes a context identifier referring to a context related to the operation request;
forwarding the operation request for the service to a first service instance set, wherein the first service instance set is identified by the service controller as handling the context related to the operation request and wherein the first service instance set comprises a first plurality of instances of the service and a second service instance set comprises a second plurality of instances of the service;
responsive to determining that the first service instance set is unreachable or unavailable, selecting the second service instance set as a candidate to handle the context related to the operation request; and
forwarding the operation request for the service to the second service instance set based on selecting the second service instance set.

2. The method of claim 1, the method further comprising:
selecting the first service instance set for the operation request based on at least one of load, a pre-configuration, and/or a random selection;
wherein forwarding comprises forwarding the operation request for the service to the first service instance set responsive to selecting the first service instance set.

3. The method of claim 1, the method further comprising:
storing a mapping between the context identifier and the first service instance set; and
selecting the first service instance set for the operation request based on the operation request including the context identifier and based on the mapping between the context identifier and the first service instance set;
wherein forwarding comprises forwarding the operation request for the service to the first service instance set responsive to selecting the first service instance set.

4. The method of claim 3, further comprising:
responsive to determining that the first service instance set is unreachable or unavailable after forwarding the operation request to the first service instance set, storing a mapping between the context identifier and the second service instance set; and, after forwarding the operation request for the service to the second service instance set, receiving an operation response from the second service instance set, wherein the operation response corresponds to the operation request.

5. The method of claim 4, wherein the operation request is a first operation request, the method further comprising:
receiving a second operation request including the context identifier after storing the mapping between the context identifier and the second service instance set; and
selecting the second service instance set for the second operation request based on the second operation request including the context identifier and based on the mapping between the context identifier and the second service instance set;
forwarding the second operation request for the service to the second service instance set responsive to selecting the second service instance set.

6. The method of claim 1, wherein determining that the first service instance set is unreachable or unavailable comprises determining that the first service instance set is unreachable or unavailable based on receiving an error response from the first service instance set corresponding to the operation request for the service.

7. The method of claim 1, wherein determining that the first service instance set is unreachable or unavailable comprises determining that the first service instance set is unreachable or unavailable based on failure to receive an operation response from the first service instance set corresponding to the operation request for the service.

8. The method of claim 1, wherein the first service instance set comprises a first plurality of instances of the service, and wherein the second service instance set comprises a second plurality of instances of the service.

9. The method of claim 1, further comprising:
receiving instance registrations for respective instances of the first plurality of instances of the first service instance set, wherein each of the instance registrations for the instances of the first service instance set includes a same first address;
receiving instance registrations for respective instances of the second plurality of instances of the second service instance set, wherein each of the instance registrations for the instances of the second service instance set includes a same second address;
wherein forwarding the operation request to the first service instance set comprises forwarding the operation request to the first service instance set using the first address; and
wherein forwarding the operation request to the second service instance set comprises forwarding the operation request to the second service instance set using the second address.

10. The method of claim 1, wherein forwarding the operation request to the first service instance set comprises forwarding the operation request to a first access node (SPoA) for the first service instance set, and wherein forwarding the operation request to the second service instance set comprises forwarding the operation request to a second access node (SPoA) for the second service instance set.

11. The method of claim 1, further comprising:
saving the operation request for the service in memory after forwarding the operation request to the first service instance set;

wherein forwarding the operation request to the second service instance set comprises forwarding the operation request from memory to the second service instance set.

12. The method of claim 1, wherein determining that the first service instance set is unreachable or unavailable comprise determining that the first service instance set is unreachable or unavailable based on load information relating to the first service instance set and/or based on information received from an operation and maintenance node of the communication network.

13. The method of claim 1, wherein determining that the first service instance set is unreachable or unavailable comprises at least one of determining that the first service instance set is unreachable or unavailable based on failure to receive a response to the operation request from the first service instance set, determining that the first service instance set is unreachable/unavailable based on receiving an error message in response to forwarding the operation request to the first service instance set, determining that the first service instance set is unreachable/unavailable based on a notification received from an operation and maintenance node, determining that the first service instance set is unreachable/unavailable based on an internal trigger, and/or determining that the first service instance set is unreachable/unavailable based on load reaching a threshold.

14. A service controller for a communication network, wherein the service controller comprises
a processor; and
memory coupled with the processor, wherein the memory comprises instructions that when executed by the processor cause the processor to:
receive an operation request for a service, wherein the operation request is for a consumer node of the communication network, and wherein the operation request includes a context identifier referring to a context related to the operation request;
forward the operation request for the service to a first service instance set, wherein the first service instance set is identified by the service controller as handling the context related to the operation request and wherein the first service instance set comprises a first plurality of instances of the service and a second service instance set comprises a second plurality of instances of the service;
responsive to determining that the first service instance set is unreachable or unavailable, select the second service instance set as a candidate to handle the context related to the operation request; and
forward the operation request for the service to the second service instance set based on selecting the second service instance set.

* * * * *